US012666198B2

(12) United States Patent
Kim et al.

(10) Patent No.: US 12,666,198 B2
(45) Date of Patent: Jun. 23, 2026

(54) BONE CONDUCTION MICROPHONE WITH RESONANCE CONTROL BASED ON DETERMINED AUDIO CONTEXT INFORMATION

(71) Applicant: QUALCOMM Incorporated, San Diego, CA (US)

(72) Inventors: Chun Kun Kim, Cambridge (GB); Ramji Srinivasan, Cambridge (GB); Shuwan Xue, Lexington, MA (US); Robert John Littrell, Belmont, MA (US)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 18/495,555

(22) Filed: Oct. 26, 2023

(65) Prior Publication Data

US 2025/0142250 A1 May 1, 2025

(51) Int. Cl.
*H04R 1/28* (2006.01)
*G10L 25/84* (2013.01)

(52) U.S. Cl.
CPC ............ *H04R 1/2869* (2013.01); *G10L 25/84* (2013.01); *H04R 2460/13* (2013.01)

(58) Field of Classification Search
CPC .............. H04R 1/2869; H04R 2460/13; H04R 1/083; H04R 1/245; H04R 17/10; H04R 2201/003; H04R 17/02; H04R 1/1083; G10L 25/84
See application file for complete search history.

(56) References Cited

U.S. PATENT DOCUMENTS

| | | | | |
|---|---|---|---|---|
| 2018/0130485 A1* | 5/2018 | Park | ........................ | H04R 1/245 |
| 2023/0047687 A1* | 2/2023 | Zhou | ...................... | H04R 1/245 |

OTHER PUBLICATIONS

International Search Report and Written Opinion—PCT/US2024/049090—ISA/EPO—Jan. 14, 2025.

* cited by examiner

*Primary Examiner* — Vivian C Chin
*Assistant Examiner* — Annabelle Kang
(74) *Attorney, Agent, or Firm* — Polsinelli

(57) ABSTRACT

Systems and techniques are provided for processing audio data. For example, a process can include determining audio context information corresponding to a multi-band bone conduction microphone (BCM), wherein the audio context information is indicative of at least one of noise information or voice information. A process can include generating a control signal indicative of a resonance configuration for one or more resonators of a plurality of resonators included in the multi-band BCM, wherein the resonance configuration is based on the audio context information and corresponds to one or more frequency response adjustments. A process can include transmitting the control signal to the multi-band BCM, wherein the control signal is configured to cause the multi-band BCM to generate a BCM output signal using the resonance configuration.

30 Claims, 10 Drawing Sheets

BONE CONDUCTION MICROPHONE WITH RESONANCE CONTROL BASED ON DETERMINED AUDIO CONTEXT INFORMATION

FIELD

The present disclosure generally relates to audio signal processing. For example, aspects of the present disclosure relate to resonance control of bone conduction microphones (BCMs) and/or voice accelerometers (VAs) for sensing bone-conducted vibrations of the vocal cords.

BACKGROUND

In some examples, when a user speaks (e.g., generates a self-voice signal), the user's voice may travel along two paths, including an acoustic path and a bone conduction path. Acoustic microphones can be used to pick up an acoustic path-based input audio signal using the acoustic path. The acoustic path-based input audio signal can include the user's self-voice signal and may additionally include distortion patterns from external or background signals, noise, etc. A bone conduction microphone (BCM) can be used to pick up a bone conduction path-based input audio signal using the bone conduction path. The bone conduction path-based input audio signal can include the user's self-voice signal at an improved signal-to-noise ratio (SNR). For example, the bone conduction path-based input audio signal may include a lesser and/or negligible contribution from external or background signals, noise, etc.

Voice accelerometers (VAs) are devices that can be used to sense or detect human speech (e.g., a user voice) based on sensing the bone-conducted vibrations caused by the vocal cords. Both VAs and BCMs can be used to capture mechanical vibrations through a wearer's skin, using the bone conduction path, and convert the captured mechanical vibrations into electrical signals indicative of or including the wearer's self-voice signal. In some examples, the terms "VA" and "BCM" may be used interchangeably. For instance, VAs may also be referred to as BCMs, and vice versa; a VA can be used to implement a BCM, and vice versa. BCMs (e.g., VAs) are not designed to sense air-conducted sound, as a traditional acoustic microphone would. Instead, a BCM can be designed to sense bone-conducted and/or soft tissue-conducted vibrations that are caused by, and propagate from, the user's vocal cords. To sense these bone or soft tissue-conducted vibrations, a BCM can be coupled (e.g., brought into physical contact, either directly or indirectly) with some portion of the user's body. For instance, a BCM can be placed directly on the skin, often on (or near) the head or neck.

BRIEF SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Disclosed are systems, methods, apparatuses, and computer-readable media for processing audio data. According to at least one illustrative example, a method of processing audio data is provided, the method comprising: determining audio context information corresponding to a multi-band bone conduction microphone (BCM), wherein the audio context information is indicative of at least one of noise information or voice information; generating a control signal indicative of a resonance configuration for one or more resonators of a plurality of resonators included in the multi-band BCM, wherein the resonance configuration is based on the audio context information and corresponds to one or more frequency response adjustments; and transmitting the control signal to the multi-band BCM, wherein the control signal is configured to cause the multi-band BCM to generate a BCM output signal using the resonance configuration.

In another example, an apparatus for wireless communications is provided. The apparatus includes at least one memory and at least one processor coupled to the at least one memory and configured to: determine audio context information corresponding to a multi-band bone conduction microphone (BCM), wherein the audio context information is indicative of at least one of noise information or voice information; generate a control signal indicative of a resonance configuration for one or more resonators of a plurality of resonators included in the multi-band BCM, wherein the resonance configuration is based on the audio context information and corresponds to one or more frequency response adjustments; and transmit the control signal to the multi-band BCM, wherein the control signal is configured to cause the multi-band BCM to generate a BCM output signal using the resonance configuration.

In another example, a non-transitory computer-readable medium is provided that includes instructions that, when executed by at least one processor, cause the at least one processor to: determine audio context information corresponding to a multi-band bone conduction microphone (BCM), wherein the audio context information is indicative of at least one of noise information or voice information; generate a control signal indicative of a resonance configuration for one or more resonators of a plurality of resonators included in the multi-band BCM, wherein the resonance configuration is based on the audio context information and corresponds to one or more frequency response adjustments; and transmit the control signal to the multi-band BCM, wherein the control signal is configured to cause the multi-band BCM to generate a BCM output signal using the resonance configuration.

In another example, an apparatus for wireless communications is provided. The apparatus includes: means for determining audio context information corresponding to a multi-band bone conduction microphone (BCM), wherein the audio context information is indicative of at least one of noise information or voice information; means for generating a control signal indicative of a resonance configuration for one or more resonators of a plurality of resonators included in the multi-band BCM, wherein the resonance configuration is based on the audio context information and corresponds to one or more frequency response adjustments; and means for transmitting the control signal to the multi-band BCM, wherein the control signal is configured to cause the multi-band BCM to generate a BCM output signal using the resonance configuration.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip examples or implementations, or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

Illustrative aspects of the present application are described in detail below with reference to the following figures.

DETAILED DESCRIPTION

Figure 1:
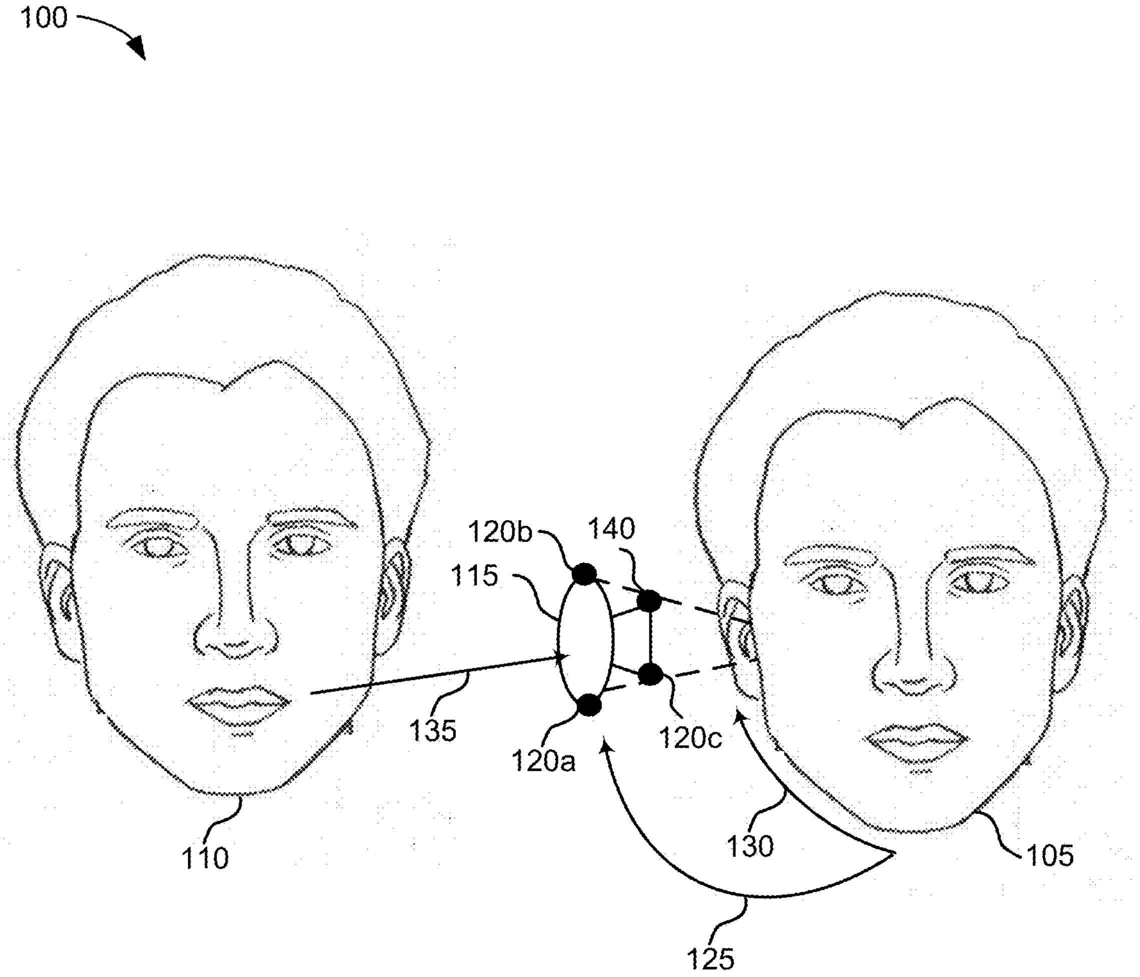
FIG. 1 is a diagram illustrating an example of an audio signaling using one or more bone conduction sensors, bone conduction microphones (BCMs), and/or voice accelerometers (VAs), in accordance with some examples.

Certain aspects and aspects of this disclosure are provided below. Some of these aspects and aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides exemplary aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the scope of the application as set forth in the appended claims.

Bone conduction microphones (BCMs) are devices that can be used to sense or detect human speech (e.g., voice) based on sensing the bone-conducted vibrations caused by the vocal cords. As used herein, a BCM may also be referred to as voice accelerometer (VA), or vice versa. In some cases, one or more VAs can be used to implement a BCM. Whereas acoustic microphones are designed to generate an audio signal based on sensing air-conducted sound waves, BCMs are designed to sense bone-conducted and/or soft tissue-conducted vibrations that are caused by, and propagate from, the user's vocal cords. To sense these bone or soft tissue-conducted vibrations, a BCM can be coupled (e.g., brought into physical contact, either directly or indirectly) with some portion of the user's body. For instance, a BCM can be placed directly on the skin, often on (or near) the user's head or neck.

In some examples, one or more BCMs can be included in various wearable devices and/or other audio and/or electronic devices. For instance, one or more BCMs can be included in wearable devices such as a pair of in-ear true wireless stereo (TWS) earbuds, AR/VR headsets, smart glasses, etc., and can be used to obtain bone conducted audio signals that capture the user's voice (e.g., the wearer's voice) against unwanted external sound, etc. In another example, one or more BCMs can be used to provide covert communications, based on the BCMs having a lower threshold of audibility or detectability of vocal sounds produced by a user. Unlike acoustic microphones, BCMs are not designed to sense air-conducted sound. In some examples, BCMs can be used for voice enhancement processing for mobile communication or various other use cases, for instance based on the BCMs greater sensitivity to bone-conducted speech rather than air-conducted background noise and other unwanted external sound(s). One or more BCMs included in earbuds or headphones can be used to capture the wearer's voice as vibration, rather than any air-conducted external sound (e.g., the one or more BCMs can be used to capture the wearer's voice vibration while rejecting sounds that are air-conducted). In another example, one or more BCMs can be used to perform voice activity detection, such as for detecting a wake-up work to activate a device that includes or is associated with the one or more BCMs (e.g., where improved accuracy of the detection of the user utterance of the wake-up word can prevent false activations).

Figure 5A:
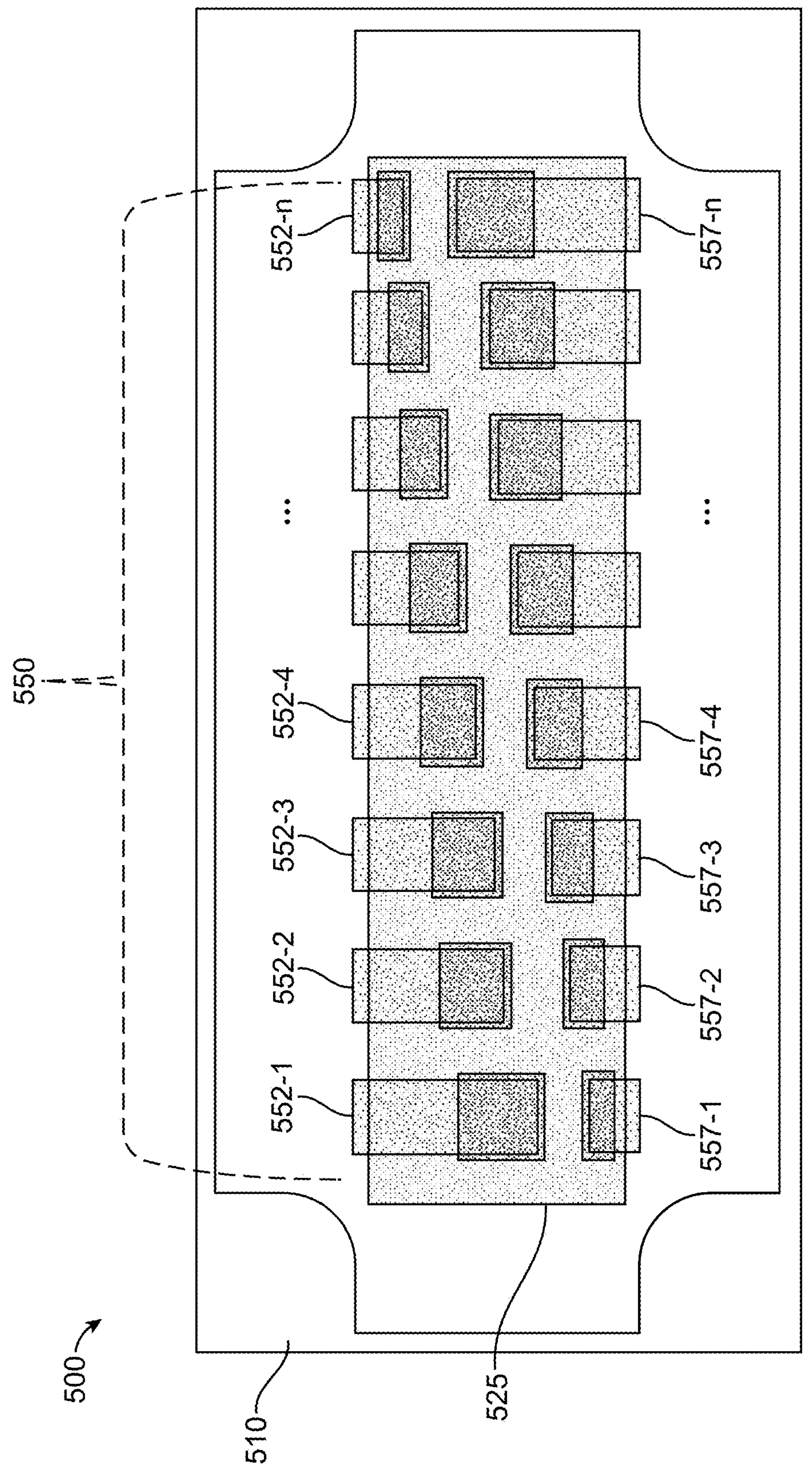
FIG. 5A is a diagram illustrating an example of a multi-band BCM that includes a plurality of sensing elements (e.g., resonators) associated with different frequency bands and frequencies, in accordance with some examples.
Figure 5B:
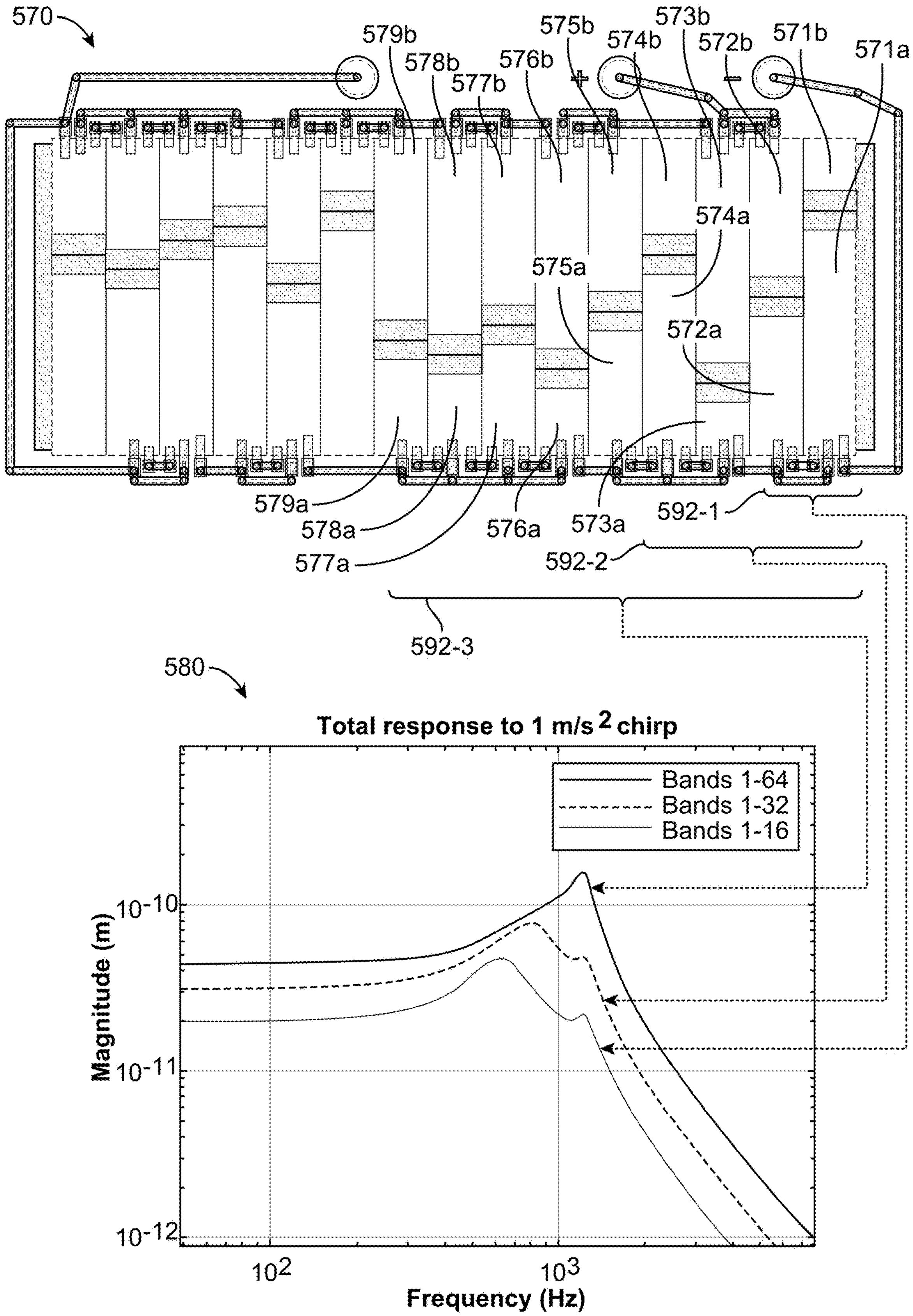
FIG. 5B is a diagram illustrating an example of a BCM with groups of multi-band resonances that can be configured and/or activated in various combinations based on context or use case information, in accordance with some examples.

In some examples, a BCM (e.g., VA) can be implemented using a microelectromechanical systems (MEMS) accelerometer, and may be referred to as a "MEMS BCM" In some cases, a MEMS BCM can implement piezoelectric sensing, capacitive sensing, and/or a combination of the two. As used herein, a "piezoelectric MEMS BCM" or "piezoelectric BCM" can refer to a MEMS BCM that implements piezoelectric sensing only (e.g., does not utilize capacitive sensing) and/or can refer to a MEMS BCM that implements at least piezoelectric sensing (e.g., utilizes piezoelectric sensing, and may additionally utilize capacitive sensing). In one illustrative example, a piezoelectric MEMS BCM can include one or more cantilevers, beams, or other sensing elements to sense and detect bone-conducted vibrations corresponding to a user's speech. For instance, FIGS. 5A and 5B illustrate example MEMS BCMs that include a plurality of cantilever sensing elements that can be used to implement multi-band resonances and/or multi-band signal processing of a bone conducted voice signal (e.g., as will be described in greater detail below).

A "capacitive MEMS BCM" or "capacitive BCM" can refer a MEMS BCM that implements capacitive sensing only (e.g., does not utilize piezoelectric sensing) and/or can refer to a MEMS BCM that implements at least capacitive sensing (e.g., utilize capacitive sensing, and may additionally utilize piezoelectric sensing). In one illustrative example, a capacitive MEMS BCM can include one or more capacitive accelerometers or other capacitive vibration sensors. The capacitive accelerometer can be used to sense and detect bone-conducted vibrations corresponding to a user's speech, based on detecting changes in electrical capacitance in response to acceleration. Accelerometers can utilize the properties of an opposed plate capacitor for which the distance between the opposed plates varies proportionally to applied acceleration, thus altering capacitance. This variable (e.g., changes in capacitance, indicative of changes in opposed plate distance) is used in a circuit to ultimately provide an output voltage signal that is proportional to the measured acceleration. Bone conduction microphones can also be implemented as non-MEMS BCMs and/or can be implemented without using a MEMS accelerometer. For example, acoustic microphone-based BCMs can utilize acoustic microphone-based capacitive sensing, where vibrations caused by the user's vocal cords are coupled into a proof mass on a housing. The vibration of the proof mass creates air-conducted sound that is captured by a conventional acoustic microphone.

BCMs and/or voice accelerometers implemented with piezoelectric MEMS technology (e.g., existing piezoelectric MEMS BCM implementations) may have a relatively high noise floor of measurement. For instance, the noise floor represents a magnitude or threshold below which the piezoelectric MEMS BCM is unable to distinguish bone-conducted sound measurements from random or external noise. In some examples, existing piezoelectric MEMS BCM implementations may be associated with higher noise floors than the respective noise floors associated with various non-piezoelectric MEMS BCM implementations (e.g., capacitive MEMS BCMs, non-MEMS BCMs, acoustic microphone-based BCMs, etc.).

An additional challenge is associated with frequency-dependent sensitivity characteristics of MEMS BCM implementations relative to the bone-conducted voice vibration frequency range (e.g., the range of voice vibration frequencies that can be bone-conducted above a detection threshold). In some examples, the bone-conducted voice vibration frequency range can include frequencies from 100 Hz-1 kHz. In some cases, the frequency range of the bone-conducted voice vibration (e.g., also referred to as the "voice band") can include frequencies below 100 Hz and/or frequencies above 1 kHz. For instance, the frequency range of bone-conducted voice vibration can be based at least in part on the respective BCM and/or VA implementation used to sense or detect the bone-conducted voice vibration frequencies. In some examples, the bone-conducted voice vibration range can be based on a location on the head where the vibrations are sensed (e.g., a location of the BCM or VA on the head or body). The bone-conducted voice vibration range can additionally be based on the respective noise floor of the BCM or VA implementation used to sense or detect the bone-conducted voice vibration frequencies. In some cases, the bone-conducted voice vibration range can correspond to the BCM or VA noise floor relative to the amplitude of the vibrations (e.g., the amplitude of the bone-conducted voice vibrations). For instance, in some examples of MEMS BCMs located at the ear, vibration energy above 1 kHz drops into the sensor's noise floor (e.g., the MEMS BCM noise floor) and may be undetectable. In some aspects, the systems and techniques described herein can be used to detect bone-conducted voice vibrations at frequencies greater than 1 kHz.

As noted above, bone conducted voice signals may typically be confined to the relatively low frequencies of human speech (e.g., corresponding to frequencies within the bone conducted voice vibration range between approximately 100 Hz and 1 kHz). The bone conducted voice vibration range is narrower than the frequency range of human speech, which may generally fall between 100 Hz and 8 kHz. Based on the bone conducted voice vibration range representing a subset of the wider frequency range of human speech, conventional BCM implementations may be unable to capture the whole frequency range of the wearer's voice as it would have been captured by an acoustic microphone. For instance, the voice captured using a BCM may sound muffled (although free from air-conducted external sound) and/or may lack clarity. To compensate for the reduced voice clarity, there is a need for BCM implementations that can be configured to extend the bandwidth of the bone conducted vibration energy that can be captured, for instance by boosting the highest possible frequency range of the bone conducted voice (e.g., around or slightly above 1 kHz), where the vibration energy may be present but much weaker.

Some BCM implementations may have a frequency response with a single resonance peak that is located outside of the 100 Hz-1 kHz voice vibration band (e.g., a resonance peak greater than 1 kHz). The resonance peak of the BCM frequency response is indicative of the resonance frequency where the BCM exhibits the highest sensitivity. For instance, a BCM with a resonance peak at 4 kHz will have higher sensitivity at frequencies near the 4 kHz resonance frequency and lower sensitivity at frequencies away from the 4 kHz resonance frequency. Some BCM implementations are highly sensitive in a fixed narrow band at higher frequencies (e.g., outside of the 100 Hz-1 kHz voice vibration band, such as in a fixed narrow band at a 4 kHz resonance frequency, etc.). In some examples, a BCM may be implemented with a resonance peak near 4 kHz and with a high Q factor. A resonance peak in the higher frequencies can be implemented with a goal of boosting the high frequency of the measured voice signal towards improved clarity. In at least some examples, the high magnitude of the resonance peak can cause the BCM to become sensitive to the air-conducted sound within its narrow frequency range. Additionally, the frequency of the resonance peak can be much higher than the voice vibration band frequencies, and the signal captured at the resonance peak does not represent the true bone-conducted voice, but additionally includes the air-conducted component, along with any unwanted external noise that may be present.

Some BCM implementations may utilize one or more low-pass filters (LPFs) to reduce the sensitivity at higher frequencies and/or at a resonance frequency outside of the voice vibration band. The use of a BCM with one or more LPFs can prevent external noise from being captured at high frequencies, such as where the resonance peak typically lies, but voice clarity is still lost.

There is a need for systems and techniques that can be used to implement a BCM that address the above-noted challenges and more. For instance, the challenges described above can limit the use of existing BCMs in voice enhancement and/or noise reduction audio signal processing techniques, as well as various other audio signal processing techniques where improved SNR and/or voice clarity is desirable or needed. There is a further need for systems and techniques that can be used to implement a BCM with multi-band resonances to provide higher sensitivity across multiple different frequencies or frequency range (e.g., higher sensitivity at or around each group of resonance frequencies associated with the BCM). There is an additional need for a BCM with multi-band resonances that can be controlled to implement multi-band processing based on factors such as context, use case, and/or user voice characteristics, etc.

Systems, apparatuses, processes (also referred to as methods), and computer-readable media (collectively referred to as "systems and techniques") are described herein that can be used to implement a bone conduction microphone (BCM) with multi-band resonances and/or groups thereof, with resonance control based on determined audio context information for the user (e.g., wearer) of the BCM. For instance, a BCM can include a plurality of resonators (e.g., cantilevers, in an example of a piezoelectric MEMS BCM) associated with a plurality of different resonance frequencies. The respective outputs of the resonators can be summed together and/or combined into a multi-band output, with different frequency bands corresponding to different resonance frequencies (or different groups of resonance frequencies). The multi-band resonances of the BCM can be used to provide an improved capture of mid- and high-frequency components of the wearer's speech (e.g., voice signal).

In one illustrative example, different combinations of the plurality of multi-band resonators of the BCM can be activated or configured to measure the wearer's bone conducted voice signal. Different combinations of the multi-band resonators (or different combinations of groupings of the multi-band resonators) can be used to implement different multi-band processing techniques for providing voice clarity boost. In some aspects, the systems and techniques can configure the multi-band resonators of the multi-band BCM based on determined audio context information associated with or corresponding to the wearer of the BCM (e.g., also referred to as the user or user of the BCM). In one illustrative example, the audio context information can also be referred to as user information or wearer information, and may be determined based on information obtained using one or more connected sensors that are external to and/or separate from the multi-band BCM.

For instance, audio context information for controlling and/or configuring the resonance(s) and multi-band processing configuration for the multi-band BCM can be determined based on information from a connected sensor comprising an acoustic microphone. The acoustic microphone can be an external microphone from an ear-worn or head-worn form factor device worn by the wearer of the BCM. In some cases, the acoustic microphone (or other external and/or connected sensor) can be included on the same device as the BCM. In some examples, the acoustic microphone (or other external and/or connected sensor used for audio context information) and the multi-band BCM can be associated with separate devices worn by the same user, such as a smartphone or various other mobile computing devices, wearable computing devices, etc. For instance, the acoustic microphone and the multi-band BCM can communicate (wired or wirelessly) with a smartphone of the user, and the smartphone can be used to implement resonance control for the multi-band BCM based on audio context information determined using an external microphone signal from the acoustic microphone.

Further aspects of the systems and techniques will be described with reference to the figures.

FIG. 1 is a diagram illustrating an example of an audio signaling scenario 100 using one or more bone conduction sensors, bone conduction microphones (BCMs), and/or voice accelerometers (VAs), in accordance with some examples. For instance, the audio signaling scenario 100 may be associated with a user 105 using a wearable device 115 to experience a listen-through feature (e.g., among various other features and use cases that can be associated with and/or implemented using one or more BCMs or VAs).

For example, a user 105 may use a wearable device 115 (e.g., a wireless communication device, wireless headset, earbuds, in-ear true wireless stereo (TWS) earbuds, speaker, hearing assistance device, or the like), which may be worn by the user 105 in a hands-free manner. In some cases, the wearable device 115 may also be referred to as a hearing device. In some examples, the user 105 may continuously wear the wearable device 115, whether the wearable device 115 is currently in use (e.g., inputting an audio signal, outputting an audio signal, or both at one or more microphones 120) or not. In some examples, the wearable device

115 may include multiple microphones 120. For instance, the wearable device 115 may include one or more outer microphones 120, such as outer microphone 120*a* and outer microphone 120*b*. Wearable device 115 may also include one or more inner microphones 120, such as inner microphone 120*c*. The wearable device 115 may use the microphones 120 for noise detection, audio signal output, active noise cancellation, and the like. A wearable device (e.g., such as the wearable device 115) can include a greater or lesser number of microphones.

When the user 105 speaks, the user 105 may generate a unique audio signal (e.g., self-voice signal). For example, the user 105 may generate a self-voice signal that may travel along an acoustic path 125 (e.g., from the mouth of user 105 to the microphones 120 of the headset). The user 105 may also generate a self-voice signal that may follow a sound conduction path 130 created by vibrations via bone conduction between the vocal cords or mouth of the user 105 and the microphones 120 of the wearable device 115. In some examples, the wearable device 115 may perform self-voice activity detection (SVAD) based on the self-voice qualities. For instance, the wearable device 115 may identify inter channel phase and intensity differences (e.g., interaction between the outer microphones 120 and the inner microphones 120 of the wearable device 115). In some cases, the wearable device 115 may use the detected differences as qualifying features to contrast self-speech signals and external signals. For example, if one or more differences between channel phase and intensity between inner microphone 120*c* and outer microphone 120*a* are detected, or if one or more differences between channel phase and intensity between inner microphone 120*c* and outer microphone 120*a* satisfy a threshold value, then the wearable device 115 may determine that a self-voice signal is present in an input audio signal.

In some examples, the wearable device 115 may provide a listen-through feature for operating in a transparent mode. A listen-through feature may allow the user 105 to hear an output audio signal from the wearable device 115 as if the wearable device 115 were not present. The listen-through feature may allow the user 105 to wear the wearable device 115 in a hands-free manner regardless of the current use-case of the wearable device 115 (e.g., regardless of whether the wearable device 115 is outputting an audio signal, inputting an audio signal, or both using one or more microphones 120). For example, an audio source 110 (e.g., a person, audio from the surrounding environment, or the like) may generate an external audio signal 135. For example, a person may speak to the user 105, creating external audio signal 135. Without a listen-through feature, the external audio signal 135 may be blocked, muffled, or otherwise distorted by the wearable device 115. A listen-through feature may utilize outer microphone 120*a*, outer microphone 120*b*, inner microphone 120*c*, or a combination to receive an input audio signal (e.g., external audio signal 135), process the input audio signal, and output an audio signal (e.g., via inner microphone 120*c*) that sounds natural to the user 105 (e.g., sounds as if the user 105 were not wearing a device).

A self-voice audio signal following acoustic path 125 and the external audio signal 135 may have different distortion patterns. For instance, the external audio signal 135, self-voice audio signal following acoustic path 125, or both may have a first distortion pattern. But self-voice following sound conduction path 130, self-voice following acoustic path 125, or both may have a second distortion pattern. The microphones 120 of the wearable device 115 may detect the self-voice audio signal and the external audio signal 135 similarly. Thus, without different treatments for the different signal types, a user 105 may not experience a natural sounding input audio signal. That is, wearable device 115 may detect an input audio signal including a combination of external audio signal 135, self-voice via acoustic path 125, or self-voice via sound conduction path 130. Wearable device 115 may detect the input audio signal using the microphones 120.

In some examples, one or more (or all) of the microphones 120 can be implemented as bone conduction microphones (BCMs) and/or voice accelerometers (VAs). A BCM can include or utilize one or more VAs to detect the bone conducted voice of a user (e.g., the bone conducted self-voice signal). In some cases, the wearable device 115 can include one or more bone conduction sensors 140. The bone conduction sensor 140 can be the same as or similar to the microphones 120 that are implemented as BCMs or VAs. In some examples, the one or more bone conduction sensors 140 may be different from one or more of the microphones 120 and/or may be different from one or more BCMs or VAs used to implement the microphones 120. In some examples, the one or more bone conduction sensors 140 can be BCMs and/or VAs.

In some cases, a user 105 may experience bone conduction when speaking using wearable device 115. For example, bone conduction may be the conduction of sound to the inner ear through the bones of the skull, which may allow the user 105 to perceive audio (e.g., speech or self-voice, etc.) using vibrations in the bone. In some examples, bone may convey lower-frequency sounds better than higher-frequency sound. The bone conduction sensor 140 may include a transducer that outputs a signal based on the vibrations of the bone due to audio. Additionally or alternatively, the bone conduction sensor 140 may include any device (e.g., a sensor, or the like) that detects a vibration and outputs an electronic signal.

In some examples, the wearable device 115 may receive an input audio signal from outer microphone 120*a*, outer microphone 120*b*, or both (e.g., an external audio signal 135, the self-voice of the user 105, or both) and an input audio signal from an inner microphone 120*c*. The wearable device 115 may output an audio signal (e.g., the bone conduction signal) to a speaker or other audio device (e.g., including various speakers or audio playback devices the user 105 can hear, etc.).

Figure 2:
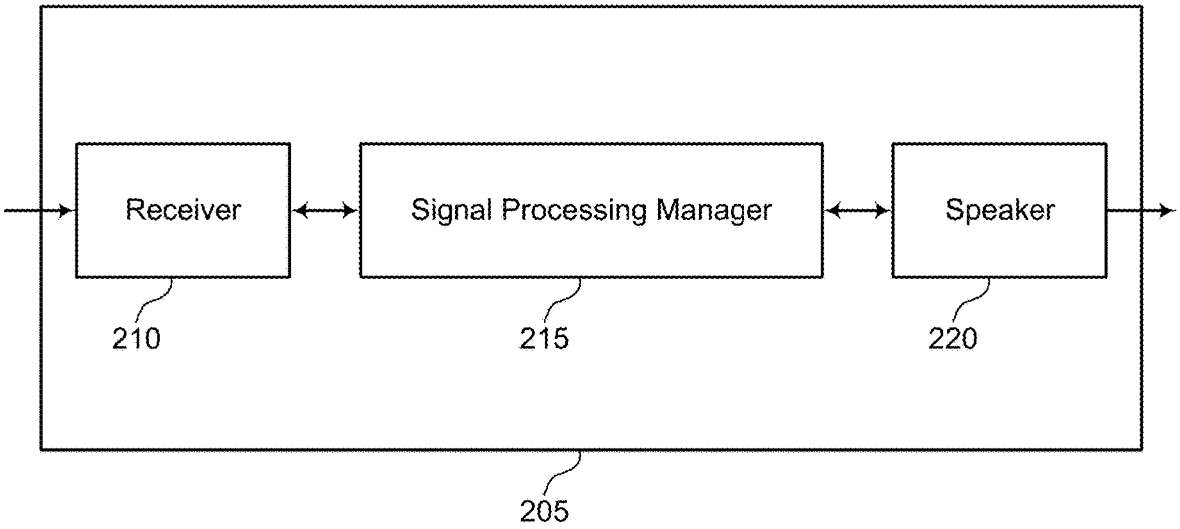
FIG. 2 is a diagram illustrating an example of a wearable device that can be used to perform audio signal processing using one or more BCMs to sense bone conducted voice or speech signals using one or more audio frequency bands within the voice vibration frequency range of human speech, in accordance with some examples.

FIG. 2 is a diagram illustrating an example of a wearable device 205 that can be used to perform audio signal processing using one or more bone conduction microphones (BCMs) (e.g., VAs) to sense bone conducted voice or speech signals using one or more audio frequency bands within the voice vibration frequency range of approximately 100 Hertz (Hz) to 1 kilohertz (kHz), in accordance with some examples. In some cases, the wearable device 205 may be an example of aspects of a wearable device 115 of FIG. 1. The wearable device 205 may include a receiver 210, a signal processing manager 215, and a speaker 220. The wearable device 205 may also include a processor. Each of these components may be in communication with one another (e.g., via one or more buses).

The receiver 210 may receive audio signals from a surrounding area (e.g., via an array of microphones, including one or more BCMs for sensing bone conducted voice or speech signals). Detected audio signals may be passed on to other components of the wearable device 205. The receiver 210 may utilize a single antenna or a set of antennas to communicate wirelessly with other devices and/or may utilize one or more wired connections to communicate with other devices.

The signal processing manager 215 may receive, at the wearable device 205 including at least one BCM for bone conducted audio sensing, a corresponding one or more bone conducted audio signals. The bone conducted audio signals can correspond to the voice or speech of a user of the wearable device 205. In some cases, the bone conducted audio signals may be received in one or more frequency bands and/or using one or more frequency band groups or subsets of the voice vibration frequency range between 100 Hz-1 kHz.

The actions performed by the signal processing manager 215 as described herein may be implemented to realize one or more potential advantages. One implementation may enable a wearable device (e.g., wearable device 115 of FIG. 1, wearable device 205 of FIG. 2, etc.) to use a signal output of a BCM (e.g., VA) or other bone conduction sensor to account for self-voice in an audio signal. The BCM can be used to obtain a bone conducted audio signal (e.g., a bone conducted self-voice signal) of the user, which can be used for various downstream audio processing and/or audio output tasks, etc. For instance, the bone conducted audio signal can be used to implement filtering of one or more acoustic audio signals (e.g., non-bone conducted audio signals obtained from acoustic microphones), to provide a transparent mode to the user, to allow for a natural sounding self-voice as an output of the wearable device, to perform various other voice enhancement audio signal processing operations, and/or to perform various other noise reduction operations, etc., among various others. Using one or more BCMs to generate or sense bone conducted self-voice signals of the user, a processor of a wearable device (e.g., a processor controlling the receiver 210, the signal processing manager 215, the speaker 220, or a combination thereof) may improve user experience.

The signal processing manager 215, or its sub-components, may be implemented in hardware, code (e.g., software or firmware) executed by a processor, or any combination thereof. If implemented in code executed by a processor, the functions of the signal processing manager 215, or its sub-components may be executed by a general-purpose processor, a digital signal processor (DSP), an application-specific integrated circuit (ASIC), a field-programmable gate-array (FPGA) or other programmable logic device, discrete gate or transistor logic, discrete hardware components, or any combination thereof designed to perform the functions described in the present disclosure.

The signal processing manager 215, or its sub-components, may be physically located at various positions, including being distributed such that portions of functions are implemented at different physical locations by one or more physical components. In some examples, the signal processing manager 215, or its sub-components, may be a separate and distinct component in accordance with various aspects of the present disclosure. In some examples, signal processing manager 215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The speaker 220 may provide output signals generated by other components of the wearable device 205. In some examples, the speaker 220 may be collocated with one or more microphones (e.g., BCMs, VAs, and/or acoustic microphones) of wearable device 205.

Figure 3:
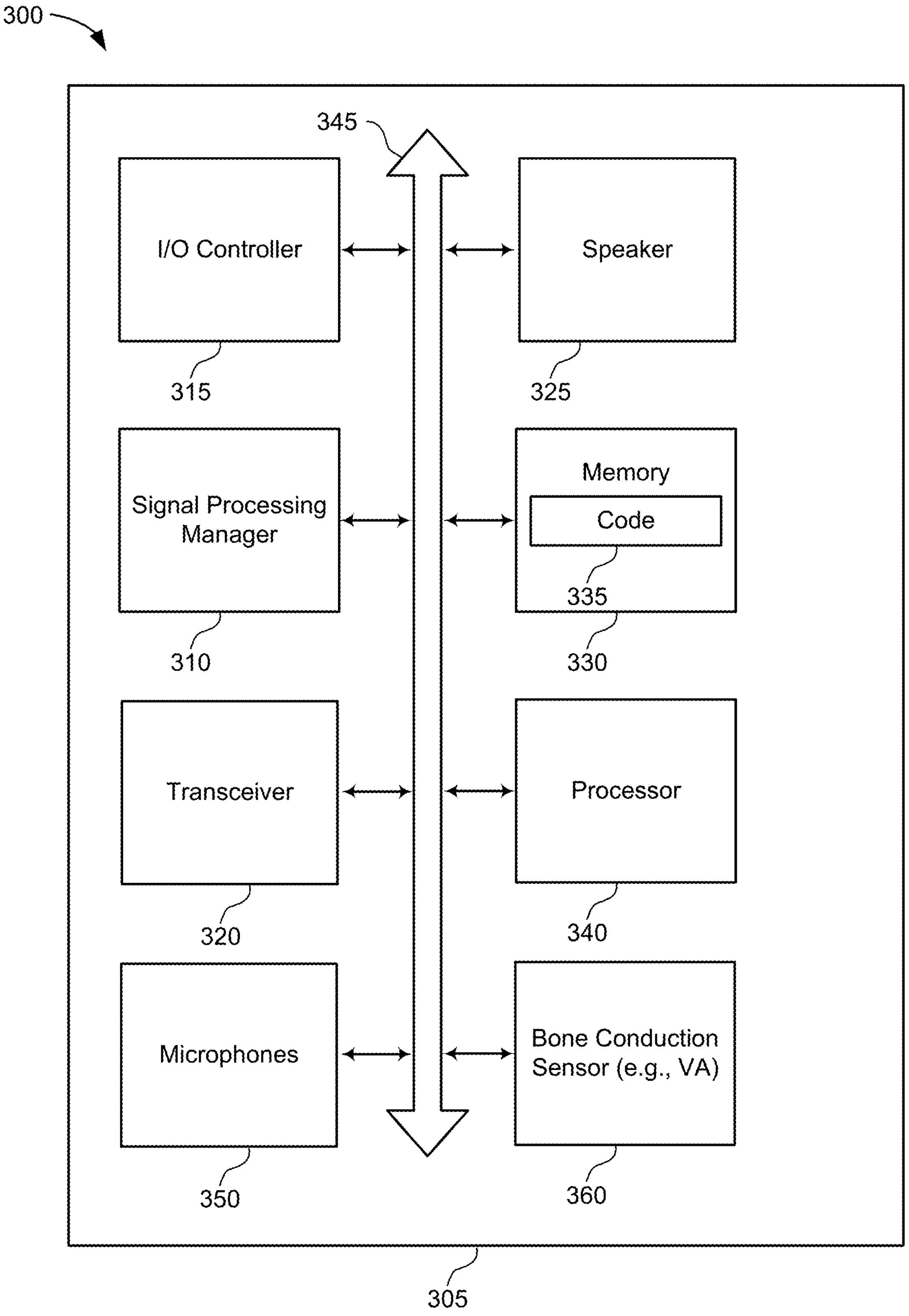
FIG. 3 is a diagram of an example audio signal processing system including a wearable device with one or more BCMs for sensing bone conducted voice or speech signals, in accordance with some examples.

FIG. 3 is a diagram of an example audio signal processing system 300 including a wearable device 305 with one or more BCMs (e.g., VAs) for sensing bone conducted voice or speech signals, in accordance with some examples. For instance, the example audio signal processing system 300 can be used to perform audio signal processing using one or more BCMs to sense bone conducted voice or speech signals using one or more audio frequency bands within the voice vibration frequency range of approximately 100 Hertz (Hz) to 1 kilohertz (kHz), in accordance with some examples.

The wearable device 305 may be an example of or include the components of wearable device 115 of FIG. 1, wearable device 205 of FIG. 2, etc. The wearable device 305 may include components for bi-directional voice and data communications including components for transmitting and receiving communications, including a signal processing manager 310, an input/output (I/O) controller 315, a transceiver 320, memory 330, and a processor 340. These components may be in electronic communication via one or more buses (e.g., bus 345).

The signal processing manager 310 may receive, at the wearable device including at least one BCM 360 (e.g., or other bone conduction sensor for bone conducted audio sensing), a corresponding one or more bone conducted audio signals. The bone conducted audio signals can correspond to the voice or speech of a user of the wearable device 205. In some cases, the bone conducted audio signals may be received in one or more frequency bands and/or using one or more frequency band groups or subsets of the voice vibration frequency range between 100 Hz-1 kHz. In some cases, the wearable device 305 can additionally include one or more microphones 350, which may be provided as acoustic (e.g., non-bone conduction) microphones. In some examples, the signal processing manager 310 can receive acoustic audio signals from the one or more acoustic microphones 350 and can receive one or more bone conducted audio signals from the one or more BCMs 360.

The I/O controller 315 may manage input and output signals for the wearable device 305. The I/O controller 315 may also manage peripherals not integrated into the wearable device 305. In some cases, the I/O controller 315 may represent a physical connection or port to an external peripheral. In some cases, the I/O controller 315 may utilize an operating system such as iOS®, ANDROID®, MS-DOS®, MS-WINDOWS®, OS/2®, UNIX®, LINUX®, or other known operating system(s). In some examples, the I/O controller 315 may represent or interact with a modem, a keyboard, a mouse, a touchscreen, or a similar device. In some cases, the I/O controller 315 may be implemented as part of a processor. In some cases, a user may interact with the wearable device 305 via the I/O controller 315 or via hardware components controlled by the I/O controller 315.

The transceiver 320 may communicate bi-directionally, via one or more antennas, wired, or wireless links. For example, the transceiver 320 may represent a wireless transceiver and may communicate bi-directionally with another wireless transceiver. The transceiver 320 may also include a modem to modulate the packets and provide the modulated packets to the antennas for transmission, and to demodulate packets received from the antennas. In some examples, listen-through features implemented using the one or more BCMs 360 (e.g., VA(s)) and corresponding bone conducted audio signals (e.g., bone conducted self-voice signals) described above may allow a user to experience natural sounding interactions with an environment while performing wireless communications or receiving data via transceiver 320.

The speaker 325 may provide an output audio signal to a user (e.g., with or without listen-through features and/or with or without combining the bone conducted audio signal(s) from the one or more BCMs 360 with the acoustic audio signal(s) from the one or more acoustic microphones 350 if present).

The memory 330 may include random-access memory (RAM) and read-only memory (ROM). The memory 330 may store computer-readable, computer-executable code 335 including instructions that, when executed, cause the processor to perform various functions described herein. In some cases, the memory 330 may contain, among other things, a basic I/O system (BIOS) which may control basic hardware or software operation such as the interaction with peripheral components or devices.

The processor 340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 340 may be configured to operate a memory array using a memory controller. In other cases, a memory controller may be integrated into the processor 340. The processor 340 may be configured to execute computer-readable instructions stored in a memory (e.g., the memory 330) to cause the wearable device 305 to perform various functions (e.g., functions or tasks supporting ASVN using a bone conduction sensor).

The code 335 may include instructions to implement aspects of the present disclosure, including instructions to support signal processing. In some cases, aspects of the signal processing manager 310, the I/O controller 315, and/or the transceiver 320 may be implemented by portions of the code 335 executed by the processor 340 or another device. The code 335 may be stored in a non-transitory computer-readable medium such as system memory or other type of memory. In some cases, the code 335 may not be directly executable by the processor 340 but may cause a computer (e.g., when compiled and executed) to perform functions described herein.

As noted previously, systems and techniques are described herein for resonance control for a multi-band BCM. The multi-band BCM can include a plurality of resonators with a plurality of resonances (e.g., resonance peaks), and the resonance control can be implemented based on audio context information determined for the wearer of the BCM. In one illustrative example, the multi-band BCM can be a multi-band piezoelectric MEMS BCM and/or voice accelerometer (VA) that includes a plurality of sensing elements (e.g., resonators) that can be used to implement a plurality of measurement bands (e.g., frequency ranges for measurement of bone-conducted sound), each sensing element having a different resonance peak (e.g., resonance frequency) relative to one or more other sensing elements of the plurality.

Figure 4:
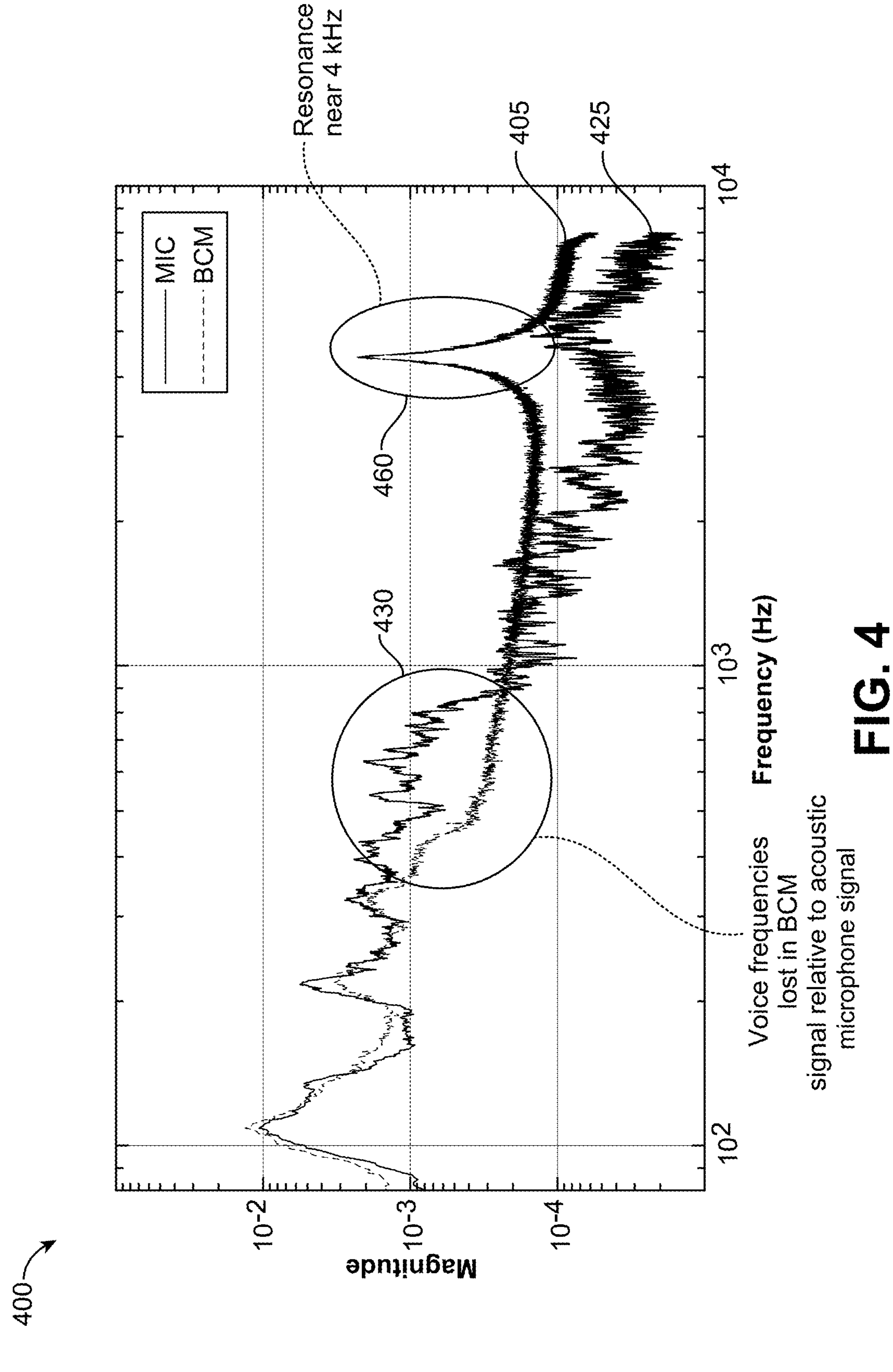
FIG. 4 is a diagram illustrating an example frequency response of an acoustic microphone and an example frequency response of a BCM, in accordance with some examples.

FIG. 4 is a diagram illustrating example frequency responses 400 corresponding to an acoustic microphone and a bone conduction microphone (BCM), in accordance with some examples. A first example frequency response 405 may correspond to a BCM (e.g., VA) and a second example frequency response 425 may correspond to an acoustic microphone. As noted previously, bone-conducted voice signals (e.g., such as signals measured by a BCM corresponding to BCM frequency response 405) may be confined in relatively low frequencies, with existing (e.g., single-band) BCMs unable to capture the whole frequency range of the wearer's voice as it would have been captured by an acoustic microphone.

For instance, the frequency response 405 of the BCM and the frequency response 425 of the acoustic microphone are approximately the same prior to the frequency range 430. Within the frequency range 430, user speech begins to exhibit loss in the BCM signal (e.g., BCM frequency response 405) relative to the acoustic microphone signal (e.g., the microphone signal associated with the frequency response 425). For instance, the magnitude of the BCM frequency response 405 is lower than the magnitude of the acoustic microphone frequency response 425 over the entirety of the frequency range 430 shown in the example of FIG. 4, representing the loss present in the BCM signal relative to the acoustic microphone signal.

As also noted previously, some BCM implementations may have a frequency response with a resonance peak that is located outside of the 100 Hz-1 kHz voice vibration band (e.g., a resonance peak greater than 1 kHz). For instance, the BCM frequency response 425 includes a resonance peak 460 at or near 4 kHz. The BCM exhibits the greatest sensitivity at and around its 4 kHz resonance peak 460, relative both to the other frequency ranges within BCM frequency response 405 as well as relative to the acoustic microphone frequency response 425 at the same frequency range 460. In some cases, the BCM sensitivity at its resonance peak may be an order of magnitude greater (or more) than the corresponding sensitivity of an acoustic microphone at the BCM resonance frequency.

The increased sensitivity of the BCM and BCM frequency response 405 associated with the 4 kHz resonance peak 460 can be associated with the BCM capturing unwanted external, background, or other air-conducted noise leakage within the resonance frequency region 460. In some examples, BCM implementations may utilize low-pass filtering to minimize or reduce the contribution of high-frequency components near the resonance band 460. The use of one or more LPFs can cause a loss in or reduction of voice clarity of the remaining BCM bone-conducted voice signal.

For instance, a BCM that loses high-frequency components of its measured sound (e.g., a BCM that is configured to LPF or suppress higher frequencies near the resonance peak 460) may be free of unwanted air-conducted external sound, but can sound muffled based on relatively low voice clarity such as in portions of the measured sound where the relatively high-frequency components dominate.

A BCM that is configured to maintain the relatively high-frequency components of measured sound at, near, and/or within the resonance band 460 can experience leakage of any air-conducted sounds with the same or similar frequency components. For instance, air-conducted sounds or other unwanted noise with frequency components that are within the increased sensitivity region of the BCM resonance 460 will be boosted within the resonance region 460, and represent leakage within the measured sound obtained by the BCM.

FIG. 5A is a diagram illustrating an example of a multi-band BCM 500 that includes a plurality of sensing elements (e.g., resonators) associated with a plurality of different frequency bands within the bone-conducted voice vibration range. In some aspects, multi-band BCM can be a multi-band piezoelectric MEMS BCM. In one illustrative example, the plurality of sensing elements can be provided as a plurality of cantilevers 550 having different dimensions and/or masses. As will be described in greater detail below, the resonance frequency of a particular cantilever 550 can be based on factors such as the physical dimensions of the cantilever, the mass or proof mass of the cantilever, etc. In some aspects, the multi-band piezoelectric MEMS BCM 500 can measure bone-conducted sound for a plurality of frequency bands within the bone-conducted voice vibration range, where each frequency band comprises a subset of the bone-conducted voice vibration range. The plurality of frequency bands can be overlapping or can be non-overlapping.

For instance, the 100 Hz-1 kHz voice vibration range can be divided into nine non-overlapping frequency bands that are each 100 Hz wide. In another example, the 100 Hz-1 kHz voice vibration range can be divided into nine overlapping frequency bands 120 Hz wide (e.g., an overlap of 10 Hz between adjacent frequency bands).

Each frequency band implemented by the multi-band piezoelectric MEMS BCM 500 can be associated with one or more sensing elements for measuring bone-conducted vibrations or sound. For instance, in one illustrative example, each frequency band implemented by the multi-band piezoelectric MEMS BCM 500 can be associated with one or more of the cantilevers 550. The cantilever(s) 550 associated with a particular frequency band can have individual resonance frequencies that are located within the particular frequency band. For example, a frequency band corresponding to the 200-300 Hz subset of the voice vibration range can include one or more cantilevers 550 having respective resonance frequencies between 200-300 Hz.

In some cases, each cantilever of the one or more cantilevers 550 associated with a particular frequency band can have the same resonance frequency (e.g., one resonance peak per frequency band). For instance, each cantilever 550 associated with a 200-300 Hz frequency band can have the same resonance frequency (e.g., such as 250 Hz). Individual ones of the cantilevers 550 that have the same resonance frequency can be identical to one another or can be different from one another. Cantilevers with different physical properties but the same resonance frequency can be provided based on modifying multiple physical properties of the cantilever. For instance, modifying a first physical property of a cantilever (e.g., length, cross-sectional area, etc.) can shift the resonance frequency in a first direction and modifying a second physical property of the cantilever (e.g., mass or proof mass) can shift the resonance frequency in a second direction opposite the first. For example, a shorter cantilever can have a greater resonance frequency than a longer cantilever, etc.

In some examples, at least a portion of the cantilevers 550 associated with a particular frequency band can have different resonance frequencies. For instance, at least a portion of cantilevers associated with a 200-300 Hz frequency band can be associated with different respective resonance frequencies between approximately 200-300 Hz. In some aspects, each cantilever associated with a particular frequency band of the multi-band piezoelectric MEMS BCM 500 can have a different resonance frequency (e.g., corresponding to multiple resonance peaks within the particular frequency band). In some aspects, a total or combined frequency response of the one or more cantilevers 550 associated with a particular frequency band can exhibit a combined resonance peak that is located within the particular frequency band.

In one illustrative example, the plurality of cantilevers 550 includes a first set of cantilevers 552-1, 552-2, 552-3, 552-4, . . . , **552-*n* and a second set of cantilevers 557-1, 557-2, 557-3, 557-4, . . . , 557-*n*. In some aspects, the first set of cantilevers and the second set of cantilevers can both include the same number of cantilever sensing elements (e.g., n, where the plurality of cantilevers 550** includes 2*n cantilever sensing elements).

In some cases, the first set of cantilevers and the second set of cantilevers can extend through an empty volume (e.g., an air volume) 525 within the multi-band piezoelectric MEMS BCM 500. As used herein, the empty volume 525 may also be referred to as a "back cavity." In some aspects, the plurality of cantilevers 550 can divide the empty volume (e.g., air volume) 525 into a first portion and a second portion. For instance, the first portion of the empty volume 525 can be located below the plurality of cantilevers 550 (e.g., into the page in the example of FIG. 5A) and the second portion of the empty volume 525 can be located above the plurality of cantilevers 550 (e.g., out of the page in the example of FIG. 5A). In some examples, the first and second portions of the empty volume 525 are located on opposite sides of the plurality of cantilevers 550. In some cases, a "back cavity" volume can refer to the portion of the empty volume 525 that is below the plurality of cantilevers 550. A "front cavity" volume can refer to the portion of the empty volume 525 that is above the plurality of cantilevers 550. In some cases, the back cavity volume and the front cavity volume may be lumped together, and may be collectively referred to as the "back cavity" or "back cavity volume."

Each cantilever of the plurality of cantilevers 550 can be coupled to a substrate 510 of the multi-band piezoelectric MEMS BCM 500 at a first distal end of the cantilever. In some examples, the substrate 510 can include a silicon die frame (e.g., located at or around the perimeter of the substrate 510). The second distal end of each respective cantilever can extend away from the substrate 510, into and/or through the back cavity 525. Based on attaching one end of each cantilever 550 to substrate 510, the remaining length of the cantilever (e.g., towards the second end of the cantilever) is left free to vibrate or oscillate in response to bone-conducted sound that is coupled into the multi-band piezoelectric MEMS BCM during operation.

In some aspects, the first set of cantilevers (e.g., 552-1, . . . , **552-*n*) can be attached to the substrate 510 along a first longitudinal edge of the back cavity 525, and the second set of cantilevers (e.g., 557-1, . . . 557-*n*) can be attached to the substrate 510 along a second longitudinal edge of the back cavity 525. The first and second longitudinal edges of back cavity 525 can be opposite one another, and the first set of cantilevers can extend across back cavity 525** towards the second set of cantilevers, and vice versa.

In one illustrative example, the lengths of the plurality of cantilevers can be selected such that the range of lengths (from shortest to longest) covers the entirety of the voice vibration range (from 100 Hz to 1 kHz). In some aspects, the lengths, dimensions, shapes, masses, etc., of the plurality of cantilevers 550 can be selected and/or tuned to configure the multi-band piezoelectric MEMS BCM 500 with a plurality of different resonance peaks spread across (e.g., within) the voice vibration band of 100 Hz-1 kHz. In some cases, the plurality of cantilevers 550 can be tuned to evenly cover some (or all) of the voice vibration band with different resonance peaks (e.g., the separation between adjacent resonance peaks can be equal). In some examples, the plurality of cantilevers 550 can be tuned to include a greater quantity of resonance peaks and/or a smaller separation between adjacent resonance peaks for portions of the voice vibration band corresponding to frequency ranges of interest or importance.

In some aspects, the plurality of cantilevers 550 can be tuned and/or configured as high-value Q factor bandpass filters at different frequencies (e.g., where each bandpass filter has a passband centered around the resonance peak of a particular cantilever 550 of the MEMS BCM 500). For instance, the resonance frequency (e.g., and corresponding resonance peak) of a respective cantilever (e.g., of one or more cantilevers of the plurality of cantilevers 550) can be adjusted by one or more of: changing the length of the cantilever, changing the mass/proof mass of the cantilever, changing the beam shape of the cantilever, etc. In some examples, the resonance frequency (e.g., and corresponding resonance peak) of a respective cantilever can be adjusted based on increasing or decreasing a thickness of the cantilever (e.g., where thickness of a respective cantilever of the plurality of cantilevers 550 is measured into/out of the page in the view of FIG. 5A). In some aspects, the resonance frequency (e.g., and the corresponding resonance peak) of a respective cantilever can be adjusted based on the material composition(s) used for the cantilever, such that cantilevers with a same or similar physical size and/or dimension(s) can be implemented with different resonance frequencies and/or arrangements. For instance, increasing or decreasing the stiffness of the cantilever (e.g., by using different material compositions) can increase or decrease the resonance frequency/resonance peak of the cantilever.

In some examples, cantilever 552-1 can have a smaller resonance frequency than cantilever 557-1, based on cantilever 552-1 having a greater length. Cantilever 552-1 can have a smaller resonance frequency than each of the remaining cantilevers 552-2, . . . , **552-*n* of the first set of cantilevers, based on cantilever 552-1 being the longest cantilever in the first set. Similarly, cantilever 557-1 can have a larger resonance frequency than each of the remaining cantilevers 557-2, . . . , 557-*n* of the second set of cantilever, based on cantilever 557-1** being the shortest cantilever in the second set.

In some aspects, the first set of cantilevers (e.g., 552-1, . . . , **552-*n*) and the second set of cantilevers (e.g., 557-1, . . . , 557-*n*) can include the same quantity of cantilevers having the same respective resonance frequencies. For instance, at least a portion of the cantilevers included in the first set may have a corresponding cantilever in the second set with the same resonance frequency. In the example of FIG. 5A, the cantilever 552-1 can be the same as or similar to the cantilever 557-*n* and may share the same resonance frequency. The cantilevers 552-2 and 557-(*n*−1) may be the same or similar as one another and share a common resonance frequency, etc. The cantilever 557-1 and 552-*n* may be the same as or similar to one another and share a common resonance frequency, etc. While the example of FIG. 5A depicts a multi-band MEMS BCM configured with two cantilevers at each respective length or resonance frequency associated with the multi-band MEMS BCM 500, a greater or lesser number of cantilevers may also be provided at each respective length and/or resonance frequency associated with the multi-band MEMS BCM 500 and the plurality of cantilevers 550**.

In some cases, varying the physical geometry and/or physical properties of the cantilevers 550 can be used to tune the frequency response of the MEMS BCM 500 within the voice vibration band. For example, each cantilever can be used to implement a different band (e.g., sub-band of the 100 Hz-1 kHz voice vibration band), where the plurality of cantilevers 550 can be used to implement a corresponding plurality of bands for capturing vocal cord vibrations using the MEMS BCM 500. Individual bands can be tuned by varying the design of the corresponding cantilever. In one illustrative example, configuring the plurality of cantilevers 550 with different resonance peaks (e.g., each corresponding to a different bandpass filter band or frequency range around the resonance peak) can be used to implement multiple frequency bands for audio signal processing performed within the voice vibration range of 100 Hz-1 kHz. In some aspects, the multi-band MEMS BCM 500 can use the plurality of cantilevers to obtain multi-band bone-conducted sound signals that can be provided to various downstream or subsequent multi-band sound processing operations (e.g., to improve, equalize, etc., the output of the MEMS BCM 500). For instance, the multi-band MEMS BCM 500 can provide multi-band sound data to a DSP and/or SoC associated with a downstream signal processing stage. As noted above, in some cases each cantilever of the plurality of cantilevers 550 can correspond to a different band of the multi-band data. In another example, each band of the multi-band data can correspond to a respective subset of the plurality of cantilevers 550, etc.

In some examples, the physical shape, dimensions, and/or geometry of the plurality of cantilevers 550 can be tuned or adjusted to provide a greater or lesser degree of overlap between the respective resonance peaks of adjacent cantilevers. In some cases, the MEMS BCM 500 may include a greater percentage of cantilevers associated with one or more frequencies of interest. For instance, the MEMS BCM 500 may include a greater percentage of relatively short cantilevers, which have resonance peaks in the higher frequencies. In such examples, the MEMS BCM 500 may be implemented with a relatively increased quantity of frequency bands in the frequencies of interest (e.g., higher frequencies) of the voice vibration range. In another example, a separation distance (e.g., gap) between adjacent cantilevers can be varied along the longitudinal axis of the back cavity 525. For instance, the cantilevers can be spaced closer together (e.g., smaller inter-cantilever spacing or gap between adjacent cantilevers) as the cantilevers become shorter in length and their respective resonance frequencies increase. For example, the separation gap between cantilevers 552-1 and 552-2 can be larger than the separation gap between cantilevers 552-2 and 552-3; the separation gap between cantilevers 552-2 and 552-3 can be larger than the separation gap between cantilevers 552-3 and 552-4; etc. In another example, the separation gap between cantilevers 557-4 and 557-3 can be larger than the separation gap between cantilevers 557-3 and 557-2; the separation gap between cantilevers 557-3 and 557-2 can be larger than the separation gap between cantilevers 557-2 and 557-1; etc.

In some aspects, the resonance characteristics of the cantilevers 550 can also be tuned by adjusting the damping of the respective cantilever. For example, a cantilever with relatively little damping will exhibit a relatively sharp resonance peak (e.g., rapid drop-off in sensitivity immediately to the left and right of the resonance peak, corresponding to frequencies lower and higher than the resonance frequency). By increasing the damping of a cantilever, the sharpness of the resonance peak can be reduced, and the effective band or bandwidth of the cantilever is widened. For instance, in the approximation of a cantilever as a high-value Q factor bandpass filter, increasing damping of the cantilever resonance increases the width of the passband. The Q factor (quality factor) is a dimensionless parameter that describes the damping of an oscillator or resonator. For example, the Q factor can be the ratio of initial energy stored in a resonator to energy lost in one vibration cycle of the resonator. A low Q factor represents a large amount of energy loss per vibration cycle. A low Q factor resonator is strongly damped, and the oscillation dies out rapidly. A high Q factor represents a smaller amount of energy loss per vibration cycle. A high Q factor resonator is weakly damped, and the oscillation dies out more gradually.

In some cases, each cantilever of the plurality of cantilevers 550 may operate independently from the remaining cantilevers of the plurality of cantilevers 550. For example, cantilever 552-1 may operate independently from any of cantilevers 552-2, . . . , 552-*n* and/or any of cantilevers 557-1, . . . , 557-*n*.

In one illustrative example, the plurality of cantilevers 550 can be coupled through a back cavity air pressure of the back cavity 525 of FIG. 5A. For instance, by carefully selecting the back cavity 525 size and the separation distance (e.g., gaps) between adjacent ones of the plurality of MEMS cantilevers 550, the tightly arranged cantilevers 550 can be coupled to one another by the dynamic air pressure in the back cavity 525. For instance, the separation distance or gap between adjacent cantilevers can be controlled such that the oscillation of the cantilevers into or out of the back cavity 525 creates instantaneous pressure differentials between the back cavity (e.g., below the cantilevers) and the front cavity (e.g., above the cantilevers). In some aspects, pressure forces associated with the dynamic air pressure of the back cavity 525 can be used to couple the plurality of cantilevers 550 to one another. The coupling can be referred to herein as "back cavity coupling." In some examples, the back cavity coupling of the plurality of cantilevers 550 can be associated with a respective damping force acting on each cantilever of the plurality of cantilevers 550, where each cantilever's respective damping force is based on the same (instantaneous) dynamic air pressure in the back cavity 525. In one illustrative example, the back cavity coupling can be used to implement optimal damping of the respective cantilevers of the plurality of cantilevers 550, for instance based on the interaction of the back cavity air flow through (e.g., into or out of) the separation or gaps between adjacent cantilevers.

In one illustrative example, the oscillation of each cantilever of the plurality of cantilevers 550 causes a corresponding change in volume of the back cavity 525 (e.g., the cantilever moving away from the bottom of the back cavity 525 temporarily increases the volume; the cantilever moving towards the bottom of the back cavity 525 temporarily decreases the volume). The changes in volume can be combined over the plurality of cantilevers 550 to obtain an instantaneous back cavity volume that fluctuates, driving a corresponding fluctuation or change in the back cavity air pressure. The changes in back cavity air pressure correspond to changes in the back cavity air pressure force that acts on each cantilever of the plurality of cantilevers 550, and the movement of each respective cantilever of the plurality of cantilevers 550 is coupled to each respective remaining cantilever of the plurality of cantilevers 550.

FIG. 5B is a diagram illustrating an example of a multi-band BCM 570 and corresponding example frequency responses shown in a graph 580 based on activating different resonator groups of the multi-band BCM 570, in accordance with some examples. In some examples, the multi-band BCM 570 of FIG. 5B can be the same as or similar to the multi-band BCM 500 of FIG. 5A. For instance, the example multi-band BCM 570 can be implemented as a piezoelectric MEMS BCM or VA, among various other example implementations. In one illustrative example, a piezoelectric MEMS BCM (e.g., the BCM 570) can include one or more cantilevers, beams, or other sensing elements configured as resonators for sensing and/or and detecting bone-conducted vibrations corresponding to a user's speech In some aspects, the multi-band BCM 570 can include a plurality of resonators that are tuned to (e.g., correspond to) different respective resonance frequencies. In some aspects, the resonators (e.g., also referred to as cantilevers or sensing elements) can be configured in opposed pairs. For instance, a first opposed pair includes the resonators 571*a*, 571*b*. A second opposed pair includes the resonators 572*a* and 572*b*, a third opposed pair includes the resonators 573*a* and 573*b*, a fourth opposed pair includes the resonators 574*a* and 574*b*, a fifth opposed pair includes the resonators 575*a* and 575*b*, a sixth opposed pair includes the resonators 576*a* and 576*b*, a seventh opposed pair includes the resonators 577*a* and 577*b*, an eighth opposed pair includes the resonators 578*a* and 578*b*, a ninth opposed pair includes the resonators 579*a* and 579*b*, . . . , etc.

In some aspects, the resonators of the multi-band BCM 570 of FIG. 5B can be provided as cantilevers that form opposed sensing elements for detecting the vibrations caused by the wearer's vocal cords. The plurality of resonators of multi-band BCM 570 can be used to implement a plurality of measurement bands (e.g., frequency ranges for measurement of bone-conducted sound), with each resonator having a corresponding measurement band or frequency range that is based on the respective resonance frequency of the resonator.

In one illustrative example, the systems and techniques described herein can be used to provide resonance control for a multi-band resonator BCM, such as the multi-band BCM 570 of FIG. 5B and/or the multi-band BCM 500 of FIG. 5A, etc. For instance, groups of resonators can be configured to include the respective cantilevers (e.g., resonators) that correspond to resonance peaks within a particular frequency band or frequency range configured for the particular group.

In one illustrative example, a first group of resonators 592-1 can include the resonators 571*a*, 571*b*, 572*a*, 572*b* and may correspond to a first subset of frequency bands based on the respective resonances of resonators 571*a*-572*b*. For instance, an example combined frequency response is shown in graph 580 for the first group of resonators 592-1 (e.g., the bottom-most combined frequency response, corresponding to "bands 1-16" in the legend of graph 580).

A second group of resonators 592-2 can include the resonators 571*a*-572*b* (e.g., the first group of resonators 592-1) and can additionally include the resonators 573*a*, 573*b*, 574*a*, 574*b*. In total, the second group of resonators 592-2 can include the resonators 571*a*-574*b*. An example combined frequency response is shown in graph 580 for the second group of resonators 592-2 (e.g., the middle of the three combined frequency responses shown, corresponding to "bands 1-32" in the legend of graph 580).

A third group of resonators 592-3 can include the resonators 571*a*-574*b* (e.g., the second group of resonators 592-2) and can additionally include the resonators 575*a*, 575*b*, 576*a*, 576*b*, 577*a*, 577*b*, 578*a*, 578*b*, 579*a*, 579*b*. In total, the third group of resonators 592-3 can include the resonators 571*a*-579*b*. An example combined frequency response is shown in graph 580 for the third group of resonators 592-3 (e.g., the top-most of the three combined frequency responses shown, corresponding to "bands 1-64" in the legend of graph 580).

The example resonator groups 592-1, 592-2, and 592-3 are shown as overlapping groups of resonances (e.g., resonator group 592-3 is inclusive of resonator group 592-2 which is inclusive of resonator group 592-1). In some aspects, one or more (or all) of the respective resonator groups of a plurality of resonator groups that may be configured for multi-band BCM 570 can be disjoint (e.g., non-overlapping) groupings of the various resonances and resonance peaks associated with the respective cantilevers (e.g., resonators) included in the multi-band BCM 570.

In the example of graph 580, showing the simulated sensitivity for the respective resonator groups 592-1, 592-2, 592-3, the different combinations of resonators and resonances in each respective group corresponds to a different sensitivity or frequency response over the measurement range of the multi-band BCM 570. In one illustrative example, by controlling the multi-band resonances and configurations or groupings thereof for the multi-band BCM 570, the systems and techniques can configure the multi-band BCM 570 to measure bone-conducted sound signals using resonance configurations that correspond to a determined context, use case, user voice characteristics, etc.

Figure 6:
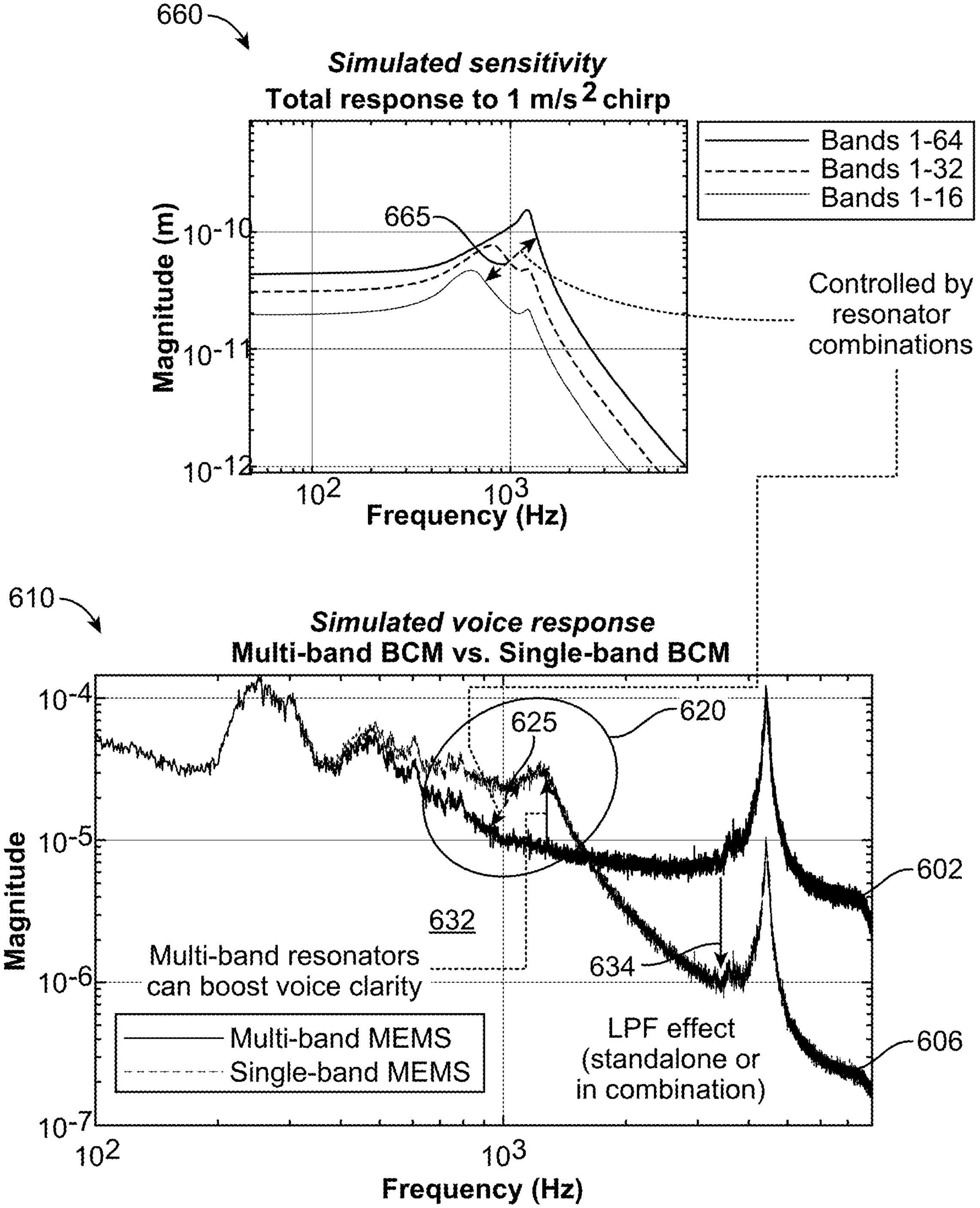
FIG. 6 is a diagram illustrating an example frequency response of multi-band MEMS resonators used to implement a BCM and an example frequency response of single-band MEMS resonators used to implement a BCM, in accordance with some examples.

FIG. 6 is a diagram illustrating an example voice responses graph 610 for a multi-band MEMS BCM and a single-band MEMS BCM, and example sensitivities shown in a graph 660 for configured resonance groups of the multi-band MEMS BCM. In some aspects, the multi-band MEMS BCM response 606 can correspond to a multi-band BCM that is the same as or similar to one or more of the BCM 500 of FIG. 5A, the BCM 570 of FIG. 5B, etc. In some cases, the single-band MEMS BCM response 602 can be the same as or similar to the single-band BCM response 405 of FIG. 4, exhibiting a sharp resonance peak and increased sensitivity at approximately 4 kHz.

In some cases, the sensitivities graph 660 of FIG. 6 can be the same as or similar to the sensitivities graph 580 of FIG. 5B, for instance with a first sensitivity (e.g., the top-most of the three sensitivities) corresponding to "bands 1-64" and/or the resonator group 592-3 of FIG. 5B, a second sensitivity (e.g., the middle of the three sensitivities) corresponding to "bands 1-32" and/or the resonator group 592-2 of FIG. 5B, and a third sensitivity (e.g., the bottom-most of the three sensitivities) corresponding to "bands 1-16" and/or the resonator group 592-1 of FIG. 5B.

In some examples, the single-band MEMS BCM response 602 included in the example voice responses graph 610 can correspond to a traditional BCM design featuring a relatively flat frequency response follow by a resonance peak at or near 4 kHz. As noted above, the multi-band MEMS BCM response 606 can correspond to a multi-band BCM such as the multi-band BCM 500 of FIG. 5A and/or the multi-band BCM 5780 of FIG. 5B. In one illustrative example, the systems and techniques described herein can use a number of multi-band resonators placed (e.g., tuned) to different resonance frequencies to boost and/or better capture mid-frequency components and/or high-frequency components of a bone-conducted voice signal.

For instance, within the frequency range 620 (e.g., centered at approximately 1 kHz in the example of FIG. 6), the multi-band BCM response 606 exhibits greater sensitivity and an improved frequency response relative to that of the single-band BCM response 602. In one illustrative example, the multi-band resonators of the multi-band BCM can be configured to boost voice clarity of the measured bone-conducted voice signal within the frequency range 620. For instance, voice clarity can be boosted (e.g., increased and/or improved) based on using the multi-band resonators of a multi-band BCM to obtain a frequency response with an increased magnitude within the frequency range 620 (e.g., the vertical differential 632 between single-band BCM response 602 and multi-band BCM response 606 along the magnitude axis of graph 610).

The frequency response boost 632 within the frequency range 620 (e.g., mid-range voice frequencies around 1 kHz) can be used to flatten the multi-band BCM response 606 over a wider range of voice frequencies than the single-band BCM response 602.

The particular shape of the multi-band BCM response 606 within frequency range 620 can be achieved and/or controlled by the different resonator combinations of the plurality of different resonators and resonance frequencies that are implemented by or included in the multi-band BCM. For instance, the frequency response differential 625 of FIG. 6 (e.g., between multi-band BCM response 606 and single-band BCM response 602) can be based on and/or controlled by the different resonator combinations, groupings, and configurations thereof. The same choice or configuration of different resonator group combinations of the multi-band BCM can be associated with the differential 665 between the different sensitivities shown in graph 660 and the differential 625 between the multi- and single-band BCM responses shown in graph 610. In some aspects, the differentials 665 and 625 can be implemented to tune, modify, boost, etc., various portions of the frequency response of the multi-band BCM when using a particular configuration of different resonator groups and resonances to obtain and process the bone-conducted voice vibration signal. In some aspects, the combination of different resonators and resonances that are activated for the multi-band BCM to obtain a particular multi-band BCM response 606 can be configured to account for individual differences in the voice spectra and provide corresponding frequency response adjustments (e.g., boosts or increases in magnitude of response at one or more frequencies configured to enhance voice clarity).

The multi-band BCM configurations implemented by the systems and techniques described herein may additionally be used to perform low-pass filtering and/or implement an LPF effect at or near the high-frequency resonance peak of the BCM (e.g., the 4 kHz resonance shown in FIG. 6 and graph 610). For instance, the resonator and resonance combinations or groupings activated for a multi-band BCM can be selected and/or configured to provide an LPF effect based on reducing the magnitude of the multi-band BCM responses 606 by a vertical differential 634 (e.g., along the magnitude axis of graph 610). In some aspects, the vertical differential 634 corresponding to the multi-band BCM LPF effect can be relative to the magnitude of the single-band BCM response 602 at the same frequencies within or near the resonance peak (e.g., at or near 4 kHz). In some examples, the multi-band BCM can be configured (e.g., based on resonance control information) to implement the LPF effect corresponding to the vertical differential 634 as a standalone frequency response modification or as a frequency response modification in combination with one or more of the mid-frequency adjustments (e.g., corresponding to differentials 632, 625) within the mid-frequency range 620.

Figure 7:
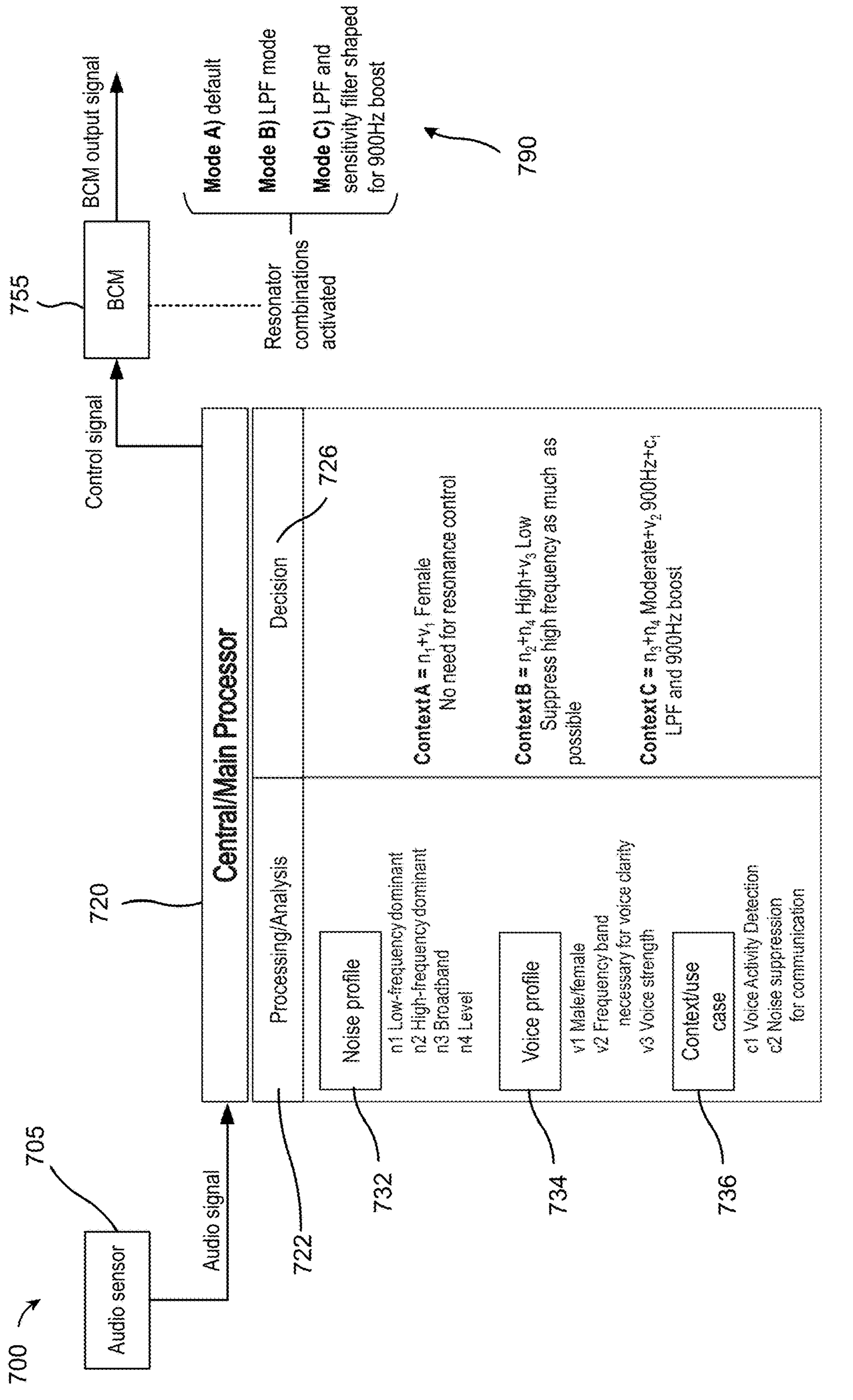
FIG. 7 is a diagram illustrating an example system for context-aware resonance control for a multi-band BCM, in accordance with some examples.

FIG. 7 is a diagram illustrating an example system 700 for context-aware resonance control for a multi-band BCM, in accordance with some examples. For instance, a BCM 755 can be a multi-band BCM and may be the same as or similar to one or more of the multi-band BCM 500 of FIG. 5A, the multi-band BCM 570 of FIG. 5B, a multi-band BCM associated with the multi-band BCM response 606 of FIG. 6, etc.

In some aspects, the multi-band resonances of the multi-band BCM 755 can be used to provide an improved capture of mid- and high-frequency components of the wearer's speech (e.g., bone-conducted voice signal).

For instance, in one illustrative example, different resonator combinations 790 of the plurality of multi-band resonators of the multi-band BCM 755 can be activated or configured for the multi-band BCM 755 to measure the wearer's bone conducted voice signal. In some aspects, the resonator combinations 790 can be activated based on a result of a multi-band processing analysis (performed by a multi-band processing analysis engine 722) and corresponding multi-band processing configuration decision (determined by a multi-band configuration engine 726) determined by a central or main processor 720 that is associated with the multi-band BCM 755. The multi-band configuration engine 726 can also be referred to herein as a multi-band resonance control configuration engine 726.

The central processor 720 can be associated with, but separate from, the multi-band BCM 755. For instance, the central processor 720 can be included in a companion device, smartphone, mobile computing device, wearable device, etc., that is associated with (e.g., communicates with) both the multi-band BCM 755 and an audio sensor 705. The central processor 720 can additionally be separate and distinct from an Application-Specific Integrated Circuit (ASIC) integrated within and/or implemented by the multi-band BCM 755.

In one illustrative example, the audio sensor 705 can be an acoustic microphone or other audio sensor configured to generate an audio signal corresponding to external (e.g., air-conducted audio) measured in the same environment or within the vicinity of the multi-band BCM 755. In some aspects, the audio sensor 705 can be used to obtain an external microphone signal from an ear-worn or head-worn form factor audio device that includes the audio sensor 705. The audio device including the audio sensor 705 may additionally include the multi-band BCM 755, or the multi-band BCM 755 can be included in a different audio device from the audio sensor 705. In some aspects, the computing device that includes central processor 720 can include one or more (or both) of the audio sensor 705 and/or the multi-band BCM 755. In some aspects, the audio sensor 705, central processor 720, and multi-band BCM 755 can be implemented using a respective three different audio devices.

Different combinations of the multi-band resonators (or different combinations of groupings of the multi-band resonators) of the multi-band BCM 755 can be determined by the central processor 720 and used to implement different multi-band processing techniques for providing voice clarity boosting, shaping, etc. for various frequencies of interest. For instance, the central processor 720 can use the external (e.g., air-conducted) audio signal from audio sensor 705 to generate a control signal indicative of a multi-band processing configuration determined by the multi-band configuration engine 726 for the multi-band BCM 755. In some aspects, the multi-band processing configuration determined by the multi-band configuration engine 726 can also be referred to as a resonance configuration, a resonance control or resonance control information, and/or decision, etc.

In some aspects, the central processor 720 can implement a multi-band processing analysis engine 722 that is configured to determine the need and shape of the desired sensitivity frequency characteristics for measuring a voice signal using the multi-band BCM 755 (e.g., central processor 720 can use multi-band processing analysis engine 722 to determine the need and shape of desired sensitivity frequency characteristics for the BCM output signal measured/generated by the multi-band BCM 755 when using a particular one of the plurality of BCM resonator combinations 790).

In one illustrative example, the external audio signal from audio sensor 705 can be used by the multi-band processing analysis engine 722 to determine audio context information associated with or corresponding to the wearer of the multi-band BCM 755 (e.g., which may also be the wearer of the audio sensor 705 and/or the user of the computing device that includes central processor 720). In some aspects, the audio context information can also be referred to as user information or wearer information, and may be determined based on information obtained using one or more connected sensors that are external to and/or separate from the multi-band BCM (e.g., audio sensor 705 and/or one or more additional audio sensors, etc.).

For instance, audio context information for controlling and/or configuring the resonance(s) and multi-band processing configuration for the multi-band BCM 755 can be generated by the multi-band processing analysis engine 722 and mapped to a respective one of the plurality of resonator combinations 790 by the multi-band configuration engine 726. For instance, different contexts determined by the multi-band configuration engine 726 can be mapped to respective resonator combinations 790 (e.g., also referred to as resonator modes). In some aspects, the mapping between different contexts and respective resonator modes 790 can be performed by the central processor 720 and/or the multi-band configuration engine 726, and the control signal to the multi-band BCM 755 can be indicative of the particular resonator mode 790 to be implemented. In another example, the mapping between different contexts and respective resonator modes 790 can be performed by the BCM 755 and/or an ASIC associated with the BCM 755. For instance, the control signal received by the BCM 755 from the central processor 720 can be indicative of the determined context, and the BCM 755 can determine a mapping between the determined context and the respective resonator modes 790. In both examples, the multi-band BCM 755 can be configured to generate a BCM output signal based on switching between different resonator modes 790 based on the control signal received from the central processor 720.

In one illustrative example, the multi-band processing analysis engine 722 can analyze the external audio signal from audio sensor 705 to determine noise profile information 732, voice profile information 734, and/or context or use case information 736. For instance, the noise profile information 732 can be indicative of a type of noise that is present in the external audio signal from audio sensor 705 (e.g., noise that is present in the surrounding environment of the BCM 755). In some aspects, the noise profile information can comprise an identification or selection of a particular noise profile type or value from a plurality of noise profile types or values. For instance, an $n_1$ noise profile determination may indicate that the external audio signal includes noise that is low-frequency dominant. An $n_2$ noise profile determination may indicate that the external audio signal includes noise that is high-frequency dominant. An $n_3$ noise profile determination may indicate that the external audio signal includes broadband noise (e.g., a combination of low-frequency and high-frequency noise components, with neither being dominant). An $n_4$ noise profile determination may indicate a level of the detected noise in the external audio signal (e.g., indicated by a decibel or numerical level value, a discrete range identifier such as high, medium, low, etc.). Various other noise profile indications or information associated with and/or indicative of noise within the external audio signal from audio sensor 705 can be included in the noise profile information 732 determined by the multi-band processing analysis engine 722.

In some aspects, the multi-band processing analysis engine 722 can analyze the external audio signal from audio sensor 705 to determine voice profile information 734. The voice profile information 734 can be determined based on an analysis of the voice components (e.g., user voice signal(s)) within the external audio signal. In some aspects, the voice profile information 734 can be determined based on separating the voice components and noise components within the external audio signal from audio sensor 705 (e.g., with the separation of components based at least in part of the noise profile analysis or noise profile information 732 described above). For instance, the voice profile information can be indicative of a type of voice and/or voice characteristics present in the external audio signal. In some aspects, the voice profile information 734 can comprise an identification or selection of a particular voice profile type or value from a plurality of configured (e.g., pre-determined) voice profile types or values. In one illustrative example, a $v_1$ voice profile determination may indicate that the voice is male, is female, is unknown, etc. A $v_2$ voice profile determination may indicate one or more frequency bands with low voice clarity or that may need to be boosted by the multi-band BCM 755 processing. A $v_3$ voice profile determination may indicate determined voice strength information (e.g., low, moderate, high, etc.), which can be indicative of the level(s) of the detected voice components within the external audio signal and/or can be indicative of other voice strength information. Various other voice profile indications or information associated with and/or indicative of a voice within the external audio signal from audio sensor 705 can be included in the voice profile information 734 determined by the multi-band processing analysis engine 722.

In some aspects, the multi-band processing analysis engine 722 can analyze the external audio signal from audio sensor 705 to determine context or use case information 736, which may be collectively referred to herein interchangeably as "context information," "audio context information," and/or "use case information," etc. In one illustrative example, the context information 736 can correspond to and/or indicate a use case for the BCM output signal generated by the multi-band BCM 755. For instance, a $c_1$ context determination may be indicative of a voice activity detection context or use case for the BCM output signal. A $c_2$ context determination may be indicative of a noise suppression for communication context or use case for the BCM output signal, etc. In some aspects, the context information 736 can be indicative of user-specific information corresponding to the user or wearer of the audio sensor 705 and/or multi-band BCM 755. For instance, a context determination may indicate that the wearer of BCM 755 is commuting on the subway (and a corresponding subset of multi-band processing profiles or configurations may be appropriate for use in this scenario by BCM 755), may indicate that the wearer or BCM 755 is performing a phone call in a crowded bar or other indoor location (and a corresponding subset of multi-band processing profiles or configuration may be appropriate in this scenario for use by BCM 755), etc. Various other context and/or use case information indications can be included in the context information 736 determined by the multi-band processing analysis engine 722.

In some aspects, different combinations of determined values or information for the respective noise profile 732, voice profile 734, and/or context information 736 can be mapped to different contexts or configurations within the multi-band configuration engine 726. For instance, a Context A may correspond to $n_1$ noise profile information 732 indicative of low-frequency dominant noise and $v_1$ voice profile information 734 indicative of a female voice. The multi-band configuration engine 726 can determine that the Context A information does not need resonance control, and can transmit a control signal to the BCM 755 indicative of or configuring the BCM 755 to generate the BCM output signal using the Mode A 'default' resonator combination 790.

In another example, a Context B determined for the external audio signal may correspond to a first instance of $n_2$ noise profile information 732 indicative of high-frequency dominant noise, and a second instance of $n_4$ noise profile information indicative of noise with a high level. In some aspects, multiple indications of a particular type (e.g., noise profile 732, voice profile 734, context/use case 736) can be included in a single context and/or otherwise used for mapping with a particular resonator combination or configuration 790 by the multi-band configuration engine 726. The Context B determination may additionally correspond to $v_3$ voice profile information 734 indicative of a low voice strength. In total, the example Context B determination shown in FIG. 7 can correspond to an indication of high-frequency dominant noise, with a high level (e.g., magnitude), and with a low voice strength.

Based on the Context B information or determination, the multi-band configuration engine 726 can generate a control signal causing BCM 755 to apply (e.g., activate) a resonator combination 790 that suppresses high-frequency noise components as much as possible within the BCM output signal. For instance, the resonance control configuration engine 726 can use the Context B determination to generate a control signal for BCM 755 that is directly indicative of the Mode B 'LPF mode' resonance control configuration 790. The multi-band configuration engine 726 can, in some cases, use the Content B determination to generate a control signal for BCM 755 that is indicative of the Context B information or determination but is not indicative of a particular or selected one of the resonance control configurations 790 (e.g., and BCM 755 can use the control signal context information to perform selection of a resonance control configuration 790 locally at the BCM 755).

In another example, a Context C determined for an external audio signal from audio sensor 705 may correspond to $n_3$ noise profile information 732 indicative of broadband noise type, an $n_4$ noise profile information 732 indicative of a moderate noise level, a $v_2$ voice profile information 734 indicative of 900 Hz as a target frequency band for voice clarity boosting, and a $c_1$ context/use case 736 information indicative of a voice activity detection intended use case for the BCM output signal of BCM 755. In some aspects, the Context C information or determination can be mapped to a resonance control configuration that causes BCM 755 to implement an LPF and 900 Hz frequency boost for generating the BCM output signal. For instance, the multi-band configuration engine 726 can map the Context C information or determination to a Mode C 'LPF and sensitivity filter shaper for 900 Hz boost' resonance control configuration 790, and can signal or indicate the mapping using the control signal transmitted to the BCM 755.

In some aspects, the systems and techniques can be used to analyze context information (e.g., noise profile 732 indications, voice profile 734 indications, and/or context/use case indications 736) corresponding to an external audio signal from the audio sensor 705. Based on analyzing and/or generating the context information for the external audio signal, the systems and techniques can determine one or more frequency ranges to be boosted in the BCM output signal of BCM 755 and/or can determine one or more frequency ranges to be suppressed in the BCM output signal of BCM 755. Different combinations of frequency suppression and frequency boosting can be implemented using corresponding resonance control configurations 790. In some cases, a particular resonance control configuration 790 can be mapped to multiple different combinations of the context information determined by the multi-band processing analysis engine 722.

A resonance control configuration 790 can be indicative of the particular resonators and/or resonance frequencies or bands that should be activated by the multi-band BCM 755 when measuring and generating the BCM output signal. For instance, the resonance control configuration 790 can identify a subset of the plurality of resonators of the multi-band BCM 755 (e.g., and/or a subset of the plurality of resonance frequencies or a subset of the plurality of resonance frequency bands, etc. of the multi-band BCM 755) that should be activated or deactivated. Activating a particular resonator or resonance frequency for the multi-band BCM 755 can comprise including the respective electrical output generated by the particular resonator in the BCM output signal. Deactivating a particular resonator or resonance frequency for the multi-band BCM 755 can comprise excluding the respective electrical output generated by the particular resonator from the BCM output signal. For instance, a resonator can be activated for generating the BCM output signal by setting an output weight for the resonator equal to 1 (or equal to a value greater than 0). A resonator can be deactivated for generating the BCM output signal by setting an output weight for the resonator equal to 0.

In some aspects, the control signal generated by the central processor 720 and transmitted to the BCM 755 can comprise a respective weight value for each resonator of the plurality of resonators included in the BCM 755.

In some examples, the control signal generated by the central processor 720 and transmitted to the BCM 755 can comprise an indication of a selection of a particular resonance control configuration profile of a plurality of resonance control configuration profiles that are stored in a memory of or otherwise made available locally at the BCM 755. For instance, the control signal can indicate that profile or resonance mode X should be used, and BCM 755 can access the stored information for configuring or activating the profile X (e.g., BCM 755 can store the respective weight values for each resonator of the plurality of resonators corresponding to one or more profiles).

In some cases, the multi-band BCM 755 can be a MEMS BCM associated with or including an ASIC. In some examples, one or more pins of the ASIC associated with the multi-band BCM 755 can be used to accept the control signal from the central processor 720 and/or multi-band configuration engine 726.

In some examples, the resonance control configurations 790 can be the same as or similar to equalization (EQ) profiles that are applied by the BCM 755 to different frequency bands corresponding to different groups of resonators or resonance frequencies that can be utilized by the BCM 755. In one illustrative example, the control signal can be generated by the central processor 720 to cause the multi-band BCM 755 to perform real-time or live EQ of bone-conducted voice signals based on activating a resonance control configuration 790 corresponding to the control signal.

In some aspects, activating a resonator associated with a particular resonance frequency can cause the multi-band BCM 755 to boost the frequency response at and/or near the particular resonance frequency associated with the activated resonator. In some examples, the control signal and/or a selected resonance control configuration 790 can cause the multi-band BCM 755 to activate a resonator and apply reverse polarity. Activating a resonator with reverse polarity (e.g., reversing the polarity of the resonator relative to a normal activation of the resonator) can cause the multi-band BCM 755 to suppress the frequency response at and/or near the particular resonance frequency associated with the resonator. By generating control signals and/or resonance control configurations 790 with different combinations of resonator weights, resonator polarities, etc., the systems and techniques described herein can be used to shape the frequency response of the multi-band BCM 755 for generating the BCM output signal using the multi-band processing that is most appropriate for the detected ambient conditions indicated in the context information determined by the multi-band processing analysis engine 722 (e.g., the noise profile 732, voice profile 734, and/or context/use case 736 indications described above).

In some aspects, the central processor 720 can implement the multi-band processing analysis engine 722 and the multi-band configuration engine 726 based on the external audio signal received from one or more audio sensors 705 (e.g., representing air-conducted sound, etc.) and further based on one or more feedback loops or feedback signals generated by the multi-band BCM 755.

For instance, context information and resonance control configurations can be generated based on the external audio signal(s) and based on the BCM output signal itself. In one illustrative example, a BCM output signal from the multi-band BCM 755 can be provided to the central process 720 as an additional control signal input. For instance, a user may perform a phone call while on a subway or other loud environment with relatively low SNR. Both the external audio signal from an acoustic microphone and the BCM output signal from the multi-band BCM 755 can be analyzed and used as controls for determining the appropriate resonance control configuration 790 for performing multi-band processing and/or multi-band equalization at the BCM 755. In some aspects, the resonance control configuration 790 to be applied by the BCM 755 can be determined based at least in part on comparing the external audio signal with the most recently received BCM output signal from the BCM 755. In some examples, the resonance control configuration 790 may be adjusted dynamically, based on changes detected in one or more (or both) of particular frequency components or frequency ranges within one or more (or both) of the external audio signal from audio sensor 705 and/or the BCM output signal from the multi-band BCM 755.

Figure 8:
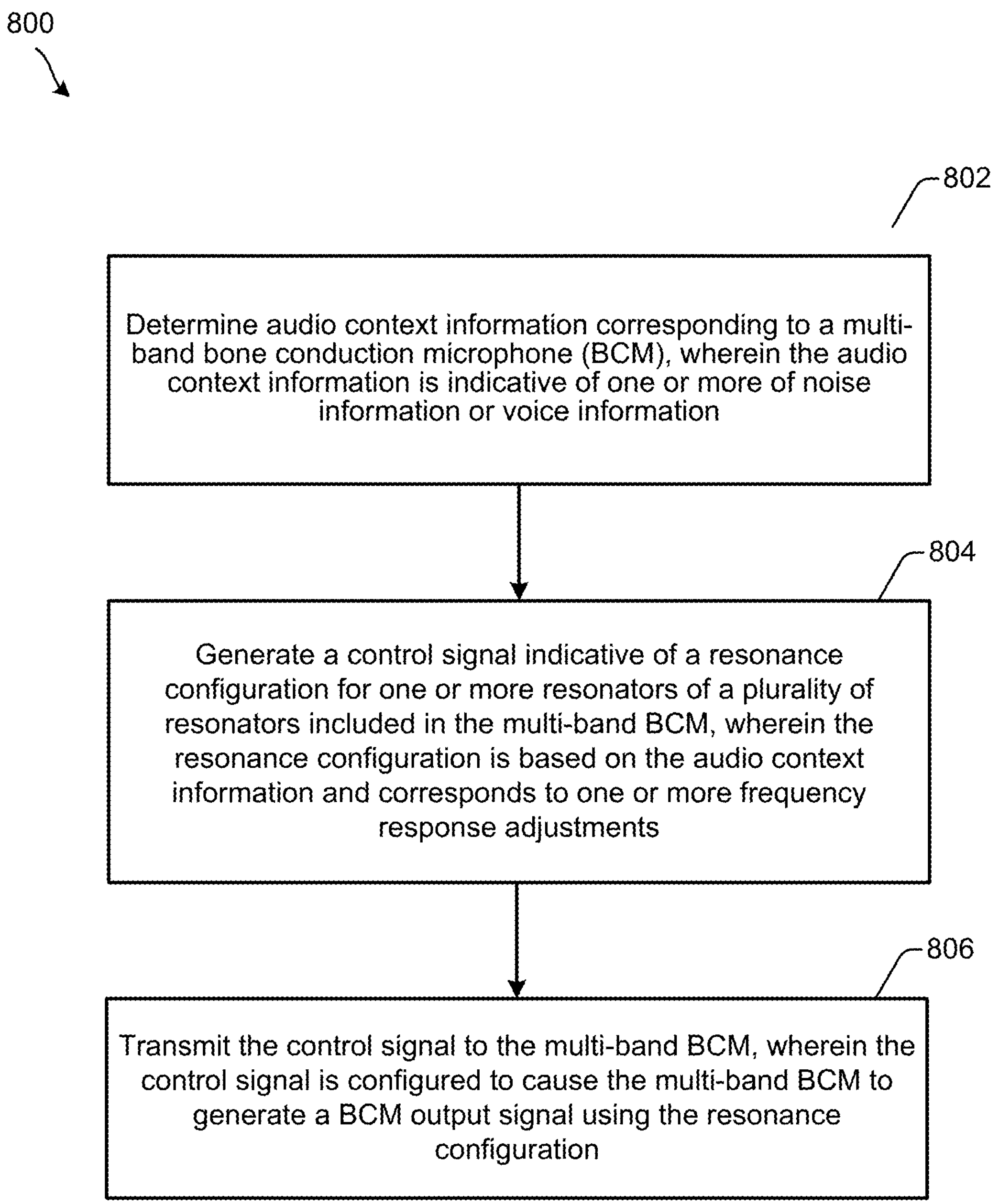
FIG. 8 is a flow chart illustrating an example of a process for processing audio data, in accordance with some examples.

FIG. 8 is a flow chart illustrating an example of a process 800 for processing audio data. The process 800 can be performed by a computing device or apparatus. In one example, the processes described herein may be performed by a wireless communication device. In one example, the processes described herein may be performed by a hearing device and/or wearable device that includes one or more multi-band BCMs (e.g., VAs) with a plurality of sensing elements (e.g., cantilevers) having different resonance frequencies. For instance, the hearing device and/or wearable device can be the same as or similar to one or more of the device 115 of FIG. 1, the device 205 of FIG. 2, and/or the audio signal processing system 300 of FIG. 3, etc. In another example, the processes described herein may be performed by a computing device with the computing system 900 shown in FIG. 9. For instance, a wireless communication device with the computing architecture shown in FIG. 9 may include the components of the multi-band BCM and/or other audio devices and may implement the operations of processes described herein.

At block 802, the process 800 includes determining audio context information corresponding to a multi-band bone conduction microphone (BCM), wherein the audio context information is indicative of at least one of noise information or voice information. For instance, the multi-band BCM can be the same as or similar to one or more of the device 115 of FIG. 1, the device 205 of FIG. 2, and/or the audio signal processing system 300 of FIG. 3, etc. In some examples, the multi-band BCM can be the same as or similar to the BCM 500 of FIG. 5A and/or the BCM 570 of FIG. 5B. In some cases, the multi-band BCM can be the same as or similar to the BCM 755 of FIG. 7.

In some cases, the audio context information can be determined by the central or main processor 720 of FIG. 7, including the processing and analysis engine 722 and/or the decision engine 726 also shown in FIG. 7. In some examples, wherein determining the audio context information comprises obtaining an audio signal from an audio sensor associated with the multi-band BCM, where the audio sensor is different from the multi-band BCM. For instance, the audio signal can be the same as or similar to the audio signal obtained from the audio sensor 705 of FIG. 7. In some examples, the audio signal can be an air-conducted audio signal, and the audio sensor is an external acoustic microphone separate from the multi-band BCM (e.g., the audio sensor 705 separate from the multi-band BCM 755 of FIG. 7).

In some cases, the audio context information can be indicative of use case information corresponding to the multi-band BCM. For instance, the audio context information can be indicative of use case information that is the same as or similar to use case information 736 of FIG. 6. In some examples, the use case information comprises at least one of a voice activity detection indication or a noise suppression indication.

In some cases, the noise information can be the same as or similar to the noise profile information 732 of FIG. 7. In some examples, the voice information can be the same as or similar to the voice profile information 734 of FIG. 7.

In some examples, the noise information can be determined based on a first subset of frequencies included in the audio signal and associated with background noise and the voice information can be determined based on a second subset of frequencies included in the audio signal and associated with voice or speech of a user. For instance, the noise information can be indicative of one or more frequencies associated with background noise within an environment of the multi-band BCM. The voice information can be indicative of one or more voice or speech characteristics corresponding to a user of the multi-band BCM.

In some cases, the noise information (e.g., the noise profile information 732 of FIG. 7) comprises at least one of a low-frequency dominant indication (e.g., the $n_1$ noise profile 732 of FIG. 7), a high-frequency dominant indication (e.g., the $n_2$ noise profile 732 of FIG. 7), a broadband indication (e.g., the $n_3$ noise profile 732 of FIG. 7), or magnitude or sound level information (e.g., the $n_4$ noise profile 732 of FIG. 7).

In some examples, the voice information (e.g., the voice profile information 734 of FIG. 7) comprises at least one of: a male or female indication (e.g., the $v_1$ the male/female voice profile 734 of FIG. 7), a voice strength indication (e.g., the $v_2$ the frequency band voice profile 734 of FIG. 7), or an indication of a frequency band with low voice clarity (e.g., the $v_3$ the voice strength voice profile 734 of FIG. 7).

In some cases, determining audio context information is based on analyzing one or more control signals to generate the noise information or the voice information. For instance, the one or more control signals can include an air-conducted audio signal obtained from an acoustic microphone external to the multi-band BCM (e.g., an acoustic microphone such as the audio sensor 705 of FIG. 7), and/or can include a BCM audio signal obtained from the multi-band BCM (e.g., the BCM output signal of BCM 755 of FIG. 7). In some cases, the BCM audio signal and the BCM output signal are the same, and the audio context information is determined based on using the BCM output signal in a feedback loop from the multi-band BCM.

At block 804, the process 800 includes generating a control signal indicative of a resonance configuration for one or more resonators of a plurality of resonators included in the multi-band BCM, wherein the resonance configuration is based on the audio context information and corresponds to one or more frequency response adjustments.

For instance, the control signal can be the same as or similar to the control signal generated by the central processor 720 of FIG. 7. The plurality of resonators can be the same as or similar to the plurality of resonators 571*a*, 571*b*, . . . , 579*a*, 579*b* of the multi-band BCM 570 of FIG. 5B. The plurality of resonators can be the same as or similar to the plurality of resonators 552-1, 557-1, . . . , 552-*n*, 557-*n* of the multi-band BCM 500 of FIG. 5A.

In some cases, the control signal can be configured to cause the multi-band BCM to implement the one or more frequency response adjustments to generate the BCM output signal (e.g., the BCM output signal generated by BCM 755 of FIG. 7). In some examples, the resonance configuration comprises resonance control information for boosting or suppressing one or more frequency bands associated with the plurality of resonators included in the multi-band BCM.

In some examples, the resonance configuration is indicative of a respective weight value for each resonator of the plurality of resonators included in the multi-band BCM. For instance, the BCM output signal can comprise a combination of a respective weighted output signal associated with each resonator of the plurality of resonators.

In some cases, the control signal is indicative of a particular resonance configuration selected from a plurality of pre-determined resonance configurations for the multi-band BCM. In some examples, each resonance configuration of the plurality of pre-determined resonance configurations is indicative of a respective subset of activated resonators of the plurality of resonators. Each activated resonator of the respective subset of activated resonators can be associated with a corresponding output weight value greater than zero.

At block 806, the process 800 includes transmitting the control signal to the multi-band BCM, wherein the control signal is configured to cause the multi-band BCM to generate a BCM output signal using the resonance configuration.

For instance, the control signal of FIG. 7 can be transmitted from the central processor 720 to the BCM 755 of FIG. 7. The BCM 755 can generate the BCM output signal of FIG. 7 based on the control signal transmitted from the central processor 720.

In some cases, the multi-band BCM is configured to implement a plurality of resonance bands, each resonance band of the plurality of resonance bands associated with a different subset of the plurality of resonators. In some examples, the resonance configuration is indicative of a respective output weight value for each resonance band of the plurality of resonance bands, and the one or more frequency response adjustments are based on increasing or decreasing the respective output weight value for one or more resonance bands.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The processes described herein can include a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the processes described herein, may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
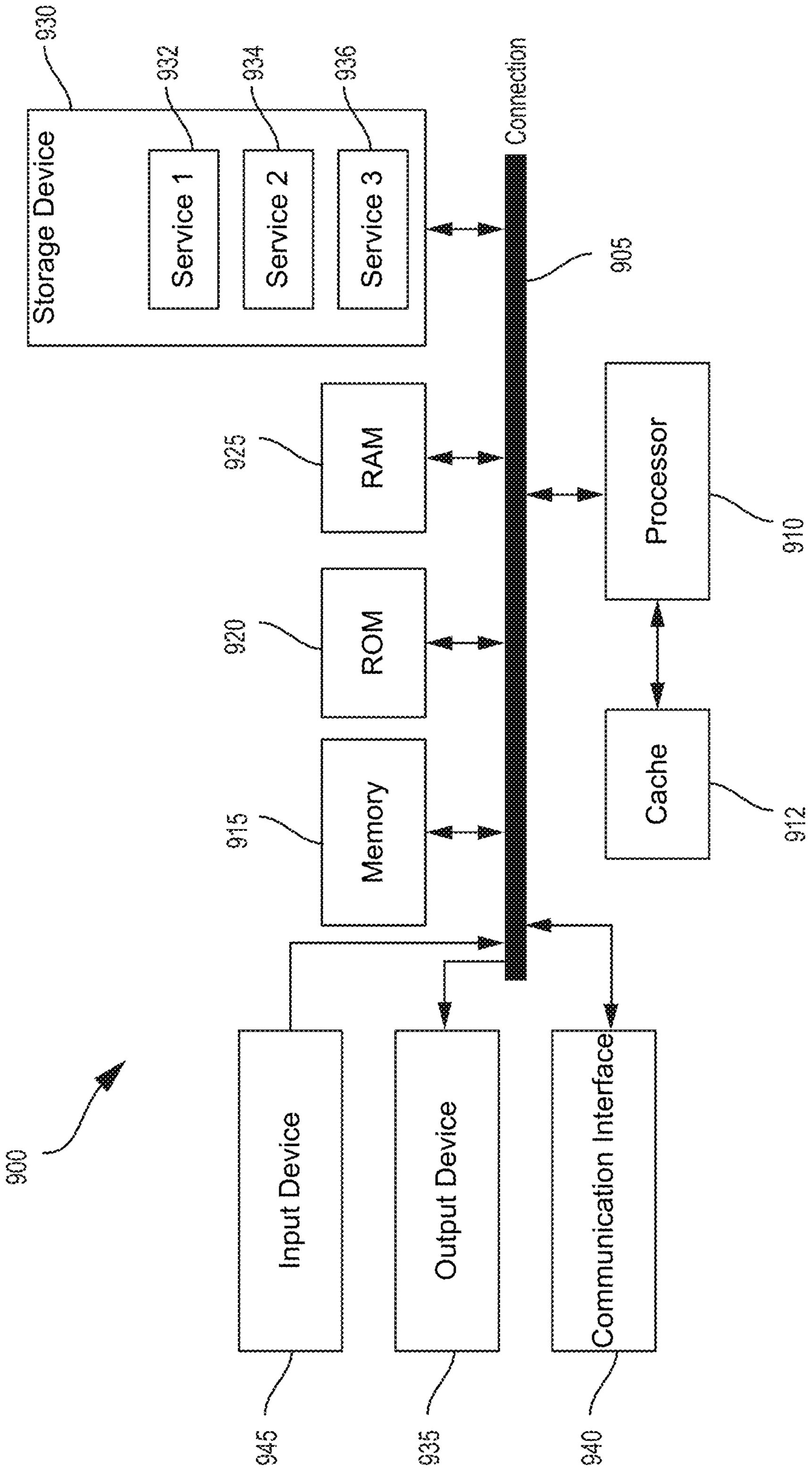
FIG. 9 is a block diagram illustrating an example of a computing system, in accordance with some examples.

FIG. 9 is a diagram illustrating an example of a system for implementing certain aspects of the present technology. In particular, FIG. 9 illustrates an example of computing system 900, which may be for example any computing device making up internal computing system, a remote computing system, a camera, or any component thereof in which the components of the system are in communication with each other using connection 905. Connection 905 may be a physical connection using a bus, or a direct connection into processor 910, such as in a chipset architecture. Connection 905 may also be a virtual connection, networked connection, or logical connection.

In some aspects, computing system 900 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 900 includes at least one processing unit (CPU or processor) 910 and connection 905 that communicatively couples various system components including system memory 915, such as read-only memory (ROM) 920 and random-access memory (RAM) 925 to processor 910. Computing system 900 may include a cache 912 of high-speed memory connected directly with, in close proximity to, or integrated as part of processor 910.

Processor 910 may include any general-purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which may represent any number of input mechanisms, such as a microphone for speech, a touch-sensitive screen for gesture or graphical input, keyboard, mouse, motion input, speech, etc. Computing system 900 may also include output device 935, which may be one or more of a number of output mechanisms. In some instances, multimodal systems may enable a user to provide multiple types of input/output to communicate with computing system 900.

Computing system 900 may include communications interface 940, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 930 may include software services, servers, services, etc., that when the code that defines such software is executed by the processor 910, it causes the system to perform a function. In some aspects, a hardware service that performs a particular function may include the software component stored in a computer-readable medium in connection with the necessary hardware components, such as processor 910, connection 905, output device 935, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general-purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. A method for processing audio, the method comprising: determining audio context information corresponding to a multi-band bone conduction microphone (BCM), wherein the audio context information is indicative of at least one of noise information or voice information; generating a control signal indicative of a resonance configuration for one or more resonators of a plurality of resonators included in the multi-band BCM, wherein the resonance configuration is based on the audio context information and corresponds to one or more frequency response adjustments; and transmitting the control signal to the multi-band BCM, wherein the control signal is configured to cause the multi-band BCM to generate a BCM output signal using the resonance configuration.

Aspect 2. The method of Aspect 1, wherein the control signal is configured to cause the multi-band BCM to implement the one or more frequency response adjustments to generate the BCM output signal.

Aspect 3. The method of any of Aspects 1 to 2, wherein determining the audio context information comprises: obtaining an audio signal from an audio sensor associated with the multi-band BCM, wherein the audio sensor is different from the multi-band BCM.

Aspect 4. The method of Aspect 3, further comprising: determining the noise information based on a first subset of frequencies included in the audio signal and associated with background noise; and determining the voice information based on a second subset of frequencies included in the audio signal and associated with voice or speech of a user.

Aspect 5. The method of any of Aspects 3 to 4, wherein the audio signal comprises an air-conducted audio signal, and wherein the audio sensor is an external acoustic microphone separate from the multi-band BCM.

Aspect 6. The method of any of Aspects 1 to 5, wherein: the noise information is indicative of one or more frequencies associated with background noise within an environment of the multi-band BCM; and the voice information is indicative of one or more voice or speech characteristics corresponding to a user of the multi-band BCM.

Aspect 7. The method of Aspect 6, wherein the noise information comprises at least one of: a low-frequency dominant indication; a high-frequency dominant indication; a broadband indication; or magnitude or sound level information.

Aspect 8. The method of any of Aspects 6 to 7, wherein the voice information comprises at least one of: a male or female indication; a voice strength indication; or an indication of a frequency band with low voice clarity.

Aspect 9. The method of any of Aspects 1 to 8, wherein the audio context information is indicative of use case information corresponding to the multi-band BCM.

Aspect 10. The method of Aspect 9, wherein the use case information comprises at least one of a voice activity detection indication or a noise suppression indication.

Aspect 11. The method of any of Aspects 1 to 10, wherein the resonance configuration comprises resonance control information for boosting or suppressing one or more frequency bands associated with the plurality of resonators included in the multi-band BCM.

Aspect 12. The method of any of Aspects 1 to 11, wherein: the resonance configuration is indicative of a respective weight value for each resonator of the plurality of resonators included in the multi-band BCM; and the BCM output signal comprises a combination of a respective weighted output signal associated with each resonator of the plurality of resonators.

Aspect 13. The method of any of Aspects 1 to 12, wherein the control signal is indicative of a particular resonance configuration selected from a plurality of pre-determined resonance configurations for the multi-band BCM.

Aspect 14. The method of Aspect 13, wherein: each resonance configuration of the plurality of pre-determined resonance configurations is indicative of a respective subset of activated resonators of the plurality of resonators; and each activated resonator of the respective subset of activated resonators is associated with a corresponding output weight value greater than zero.

Aspect 15. The method of any of Aspects 1 to 14, wherein the multi-band BCM is configured to implement a plurality of resonance bands, each resonance band of the plurality of resonance bands associated with a different subset of the plurality of resonators.

Aspect 16. The method of Aspect 15, wherein the resonance configuration is indicative of a respective output weight value for each resonance band of the plurality of resonance bands, and wherein the one or more frequency response adjustments are based on increasing or decreasing the respective output weight value for one or more resonance bands.

Aspect 17. The method of any of Aspects 1 to 16, wherein determining audio context information is based on analyzing one or more control signals to generate the noise information or the voice information.

Aspect 18. The method of Aspect 17, wherein the one or more control signals include: an air-conducted audio signal obtained from an acoustic microphone external to the multi-band BCM; and a BCM audio signal obtained from the multi-band BCM.

Aspect 19. The method of Aspect 18, wherein the BCM audio signal and the BCM output signal are the same, and wherein the audio context information is determined based on using the BCM output signal in a feedback loop from the multi-band BCM.

Aspect 20. An apparatus for processing audio, the apparatus comprising: a memory; and a processor coupled to the memory, wherein the processor is configured to: determine audio context information corresponding to a multi-band bone conduction microphone (BCM), wherein the audio context information is indicative of at least one of noise information or voice information; generate a control signal indicative of a resonance configuration for one or more resonators of a plurality of resonators included in the multi-band BCM, wherein the resonance configuration is based on the audio context information and corresponds to one or more frequency response adjustments; and transmit the control signal to the multi-band BCM, wherein the control signal is configured to cause the multi-band BCM to generate a BCM output signal using the resonance configuration.

Aspect 21. The apparatus of Aspect 20, wherein the control signal is configured to cause the multi-band BCM to implement the one or more frequency response adjustments to generate the BCM output signal.

Aspect 22. The apparatus of any of Aspects 20 to 21, wherein, to determine the audio context information, the processor is configured to: obtain an audio signal from an audio sensor associated with the multi-band BCM, wherein the audio sensor is different from the multi-band BCM.

Aspect 23. The apparatus of Aspect 22, wherein the processor is further configured to: determine the noise information based on a first subset of frequencies included in the audio signal and associated with background noise; and determine the voice information based on a second subset of frequencies included in the audio signal and associated with voice or speech of a user.

Aspect 24. The apparatus of any of Aspects 22 to 23, wherein the audio signal comprises an air-conducted audio signal, and wherein the audio sensor is an external acoustic microphone separate from the multi-band BCM.

Aspect 25. The apparatus of any of Aspects 20 to 24, wherein: the noise information is indicative of one or more frequencies associated with background noise within an environment of the multi-band BCM; and the voice information is indicative of one or more voice or speech characteristics corresponding to a user of the multi-band BCM.

Aspect 26. The apparatus of Aspect 25, wherein the noise information comprises at least one of: a low-frequency dominant indication; a high-frequency dominant indication; a broadband indication; or magnitude or sound level information.

Aspect 27. The apparatus of any of Aspects 25 to 26, wherein the voice information comprises at least one of: a male or female indication; a voice strength indication; or an indication of a frequency band with low voice clarity.

Aspect 28. The apparatus of any of Aspects 20 to 27, wherein the audio context information is indicative of use case information corresponding to the multi-band BCM.

Aspect 29. The apparatus of Aspect 28, wherein the use case information comprises at least one of a voice activity detection indication or a noise suppression indication.

Aspect 30. The apparatus of any of Aspects 20 to 29, wherein the resonance configuration comprises resonance control information configured to cause the processor to boost or suppress one or more frequency bands associated with the plurality of resonators included in the multi-band BCM.

Aspect 31. The apparatus of any of Aspects 20 to 30, wherein: the resonance configuration is indicative of a respective weight value for each resonator of the plurality of resonators included in the multi-band BCM; and the BCM output signal comprises a combination of a respective weighted output signal associated with each resonator of the plurality of resonators.

Aspect 32. The apparatus of any of Aspects 20 to 31, wherein the control signal is indicative of a particular resonance configuration selected from a plurality of pre-determined resonance configurations for the multi-band BCM.

Aspect 33. The apparatus of Aspect 32, wherein: each resonance configuration of the plurality of pre-determined resonance configurations is indicative of a respective subset of activated resonators of the plurality of resonators; and each activated resonator of the respective subset of activated resonators is associated with a corresponding output weight value greater than zero.

Aspect 34. The apparatus of any of Aspects 20 to 33, wherein the multi-band BCM is configured to implement a plurality of resonance bands, each resonance band of the plurality of resonance bands associated with a different subset of the plurality of resonators.

Aspect 35. The apparatus of Aspect 34, wherein the resonance configuration is indicative of a respective output weight value for each resonance band of the plurality of resonance bands, and wherein the one or more frequency response adjustments are based on increasing or decreasing the respective output weight value for one or more resonance bands.

Aspect 36. The apparatus of any of Aspects 20 to 35, wherein the processor is configured to determine audio context information based on analyzing one or more control signals to generate the noise information or the voice information.

Aspect 37. The apparatus of Aspect 36, wherein the one or more control signals include: an air-conducted audio signal obtained from an acoustic microphone external to the multi-band BCM; and a BCM audio signal obtained from the multi-band BCM.

Aspect 38. The apparatus of Aspect 37, wherein the BCM audio signal and the BCM output signal are the same, and wherein the processor is configured to determine audio context information based on using the BCM output signal in a feedback loop from the multi-band BCM.

Aspect 39. A method for processing audio data, comprising performing operations according to any of Aspects 20 to 38.

Aspect 40. A non-transitory computer-readable storage medium comprising instructions stored thereon which, when executed by at least one processor, causes the at least one processor to perform operations according to any of Aspects 1 to 19.

Aspect 41. A non-transitory computer-readable storage medium comprising instructions stored thereon which, when executed by at least one processor, causes the at least one processor to perform operations according to any of Aspects 20 to 38.

Aspect 42. An apparatus for processing audio data comprising one or more means for performing operations according to any of Aspects 1 to 19.

Aspect 43. An apparatus for processing audio data comprising one or more means for performing operations according to any of Aspects 20 to 38.

What is claimed is:

1. A method for processing audio, the method comprising:

determining audio context information corresponding to a multi-band bone conduction microphone (BCM), wherein the audio context information is determined based on an air-conducted audio signal obtained from an audio sensor different from the multi-band BCM, and wherein the audio context information is indicative of at least one of noise information or voice information;

generating a control signal indicative of a resonance configuration for one or more resonators of a plurality of resonators included in the multi-band BCM, wherein the resonance configuration is generated based on the audio context information and corresponds to one or more frequency response adjustments for the one or more resonators; and transmitting the control signal to the multi-band BCM, wherein the control signal is configured to cause the multi-band BCM to generate a BCM output signal using a multi-band processing configuration corresponding to the resonance configuration.

2. The method of claim 1, wherein the control signal is configured to cause the multi-band BCM to implement the one or more frequency response adjustments to generate the BCM output signal.

3. The method of claim 1, wherein determining the audio context information comprises:

obtaining the air-conducted audio signal from an acoustic microphone associated with the multi-band BCM, wherein the acoustic microphone is different from the multi-band BCM, and wherein the plurality of resonators does not include the acoustic microphone.

4. The method of claim 3, further comprising:

determining the noise information based on a first subset of frequencies included in the air-conducted audio signal and associated with background noise; and determining the voice information based on a second subset of frequencies included in the air-conducted audio signal and associated with voice or speech of a user.

5. The method of claim 3, wherein the acoustic microphone is an external acoustic microphone separate from the multi-band BCM.

6. The method of claim 1, wherein:

the noise information is indicative of one or more frequencies associated with background noise within an environment of the multi-band BCM; and the voice information is indicative of one or more voice or speech characteristics corresponding to a user of the multi-band BCM.

7. The method of claim 6, wherein the noise information comprises at least one of:

a low-frequency dominant indication;

a high-frequency dominant indication;

a broadband indication; or magnitude or sound level information.

8. The method of claim 6, wherein the voice information comprises at least one of:

a male or female indication;

a voice strength indication; or an indication of a frequency band with low voice clarity.

9. The method of claim 1, wherein the audio context information is indicative of use case information corresponding to the multi-band BCM.

10. The method of claim 9, wherein the use case information comprises at least one of a voice activity detection indication or a noise suppression indication.

11. The method of claim 1, wherein the resonance configuration comprises resonance control information for boosting or suppressing one or more frequency bands associated with the plurality of resonators included in the multi-band BCM.

12. The method of claim 1, wherein:

the resonance configuration is indicative of a respective weight value for each resonator of the plurality of resonators included in the multi-band BCM; and the BCM output signal comprises a combination of a respective weighted output signal associated with each resonator of the plurality of resonators.

13. The method of claim 1, wherein the control signal is indicative of a particular resonance configuration selected from a plurality of pre-determined resonance configurations for the multi-band BCM.

14. The method of claim 13, wherein:

each resonance configuration of the plurality of pre-determined resonance configurations is indicative of a respective subset of activated resonators of the plurality of resonators; and each activated resonator of the respective subset of activated resonators is associated with a corresponding output weight value greater than zero.

15. The method of claim 1, wherein the multi-band BCM is configured to implement a plurality of resonance bands, each resonance band of the plurality of resonance bands associated with a different subset of the plurality of resonators.

16. The method of claim 15, wherein the resonance configuration is indicative of a respective output weight value for each resonance band of the plurality of resonance bands, and wherein the one or more frequency response adjustments are based on increasing or decreasing the respective output weight value for one or more resonance bands.

17. The method of claim 1, wherein determining audio context information is based on analyzing one or more control signals to generate the noise information or the voice information.

18. The method of claim 17, wherein the one or more control signals include:
an air-conducted audio signal obtained from an acoustic microphone external to the multi-band BCM; and
a BCM audio signal obtained from the multi-band BCM.

19. The method of claim 18, wherein the BCM audio signal and the BCM output signal are the same, and wherein the audio context information is determined based on using the BCM output signal in a feedback loop from the multi-band BCM.

20. An apparatus for processing audio, the apparatus comprising:
a memory; and
a processor coupled to the memory, wherein the processor is configured to:
determine audio context information corresponding to a multi-band bone conduction microphone (BCM), wherein the audio context information is determined based on an air-conducted audio signal obtained from an audio sensor different from the multi-band BCM, and wherein the audio context information is indicative of at least one of noise information or voice information;
generate a control signal indicative of a resonance configuration for one or more resonators of a plurality of resonators included in the multi-band BCM, wherein the resonance configuration is generated based on the audio context information and corresponds to one or more frequency response adjustments for the one or more resonators; and
transmit the control signal to the multi-band BCM, wherein the control signal is configured to cause the multi-band BCM to generate a BCM output signal using a multi-band processing configuration corresponding to the resonance configuration.

21. The apparatus of claim 20, wherein the control signal is configured to cause the multi-band BCM to implement the one or more frequency response adjustments to generate the BCM output signal.

22. The apparatus of claim 20, wherein, to determine the audio context information, the processor is configured to:
obtain the air-conducted audio signal from an acoustic microphone associated with the multi-band BCM, wherein the acoustic microphone is different from the multi-band BCM, and wherein the plurality of resonators does not include the acoustic microphone.

23. The apparatus of claim 22, wherein the processor is further configured to:
determine the noise information based on a first subset of frequencies included in the air-conducted audio signal and associated with background noise; and
determine the voice information based on a second subset of frequencies included in the air-conducted audio signal and associated with voice or speech of a user.

24. The apparatus of claim 22, wherein the audio sensor is an external acoustic microphone separate from the multi-band BCM.

25. The apparatus of claim 20, wherein:
the noise information is indicative of one or more frequencies associated with background noise within an environment of the multi-band BCM; and
the voice information is indicative of one or more voice or speech characteristics corresponding to a user of the multi-band BCM.

26. The apparatus of claim 25, wherein the noise information comprises at least one of:
a low-frequency dominant indication;
a high-frequency dominant indication;
a broadband indication; or
magnitude or sound level information.

27. The apparatus of claim 25, wherein the voice information comprises at least one of:
a male or female indication;
a voice strength indication; or
an indication of a frequency band with low voice clarity.

28. The apparatus of claim 20, wherein the audio context information is indicative of use case information corresponding to the multi-band BCM.

29. The apparatus of claim 28, wherein the use case information comprises at least one of a voice activity detection indication or a noise suppression indication.

30. The apparatus of claim 20, wherein the resonance configuration comprises resonance control information configured to cause the processor to boost or suppress one or more frequency bands associated with the plurality of resonators included in the multi-band BCM.

* * * * *